(12) United States Patent
Bakhshaei et al.

(10) Patent No.: US 11,259,905 B2
(45) Date of Patent: Mar. 1, 2022

(54) SYSTEMS AND METHODS FOR SPRAY APPLICATION OF GLAZE AND OTHER MATERIALS

(71) Applicant: James R. Glidewell Dental Ceramics, Inc., Newport Beach, CA (US)

(72) Inventors: Bahram Bakhshaei, Lake Forest, CA (US); Jimmy Huy Nguyen, Hawthorne, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 403 days.

(21) Appl. No.: 16/179,475

(22) Filed: Nov. 2, 2018

(65) Prior Publication Data

US 2019/0125504 A1    May 2, 2019

Related U.S. Application Data

(60) Provisional application No. 62/580,624, filed on Nov. 2, 2017.

(51) Int. Cl.
*B05B 12/00* (2018.01)
*A61C 5/77* (2017.01)
(Continued)

(52) U.S. Cl.
CPC ............ *A61C 13/082* (2013.01); *A61C 5/77* (2017.02); *A61C 13/0004* (2013.01);
(Continued)

(58) Field of Classification Search
CPC ........ B05B 13/0242; B05B 12/02; A61C 5/77
See application file for complete search history.

(56) References Cited

U.S. PATENT DOCUMENTS 6,488,503 B1 * 12/2002 Lichkus .............. A61C 13/087
                                              264/19
2003/0194681 A1    10/2003 Stoller et al.
(Continued)

FOREIGN PATENT DOCUMENTS

KR    20130069959 A    6/2013
WO    2015082081 A1    6/2015

OTHER PUBLICATIONS

PCT Application No. PCT/US18/59007, International Search Report and Written Opinion, dated Jan. 15, 2019, in 14 pages.
(Continued)

*Primary Examiner* — Cachet I Proctor
(74) *Attorney, Agent, or Firm* — Charles Fowler

(57) ABSTRACT

Disclosed herein are methods and systems for automatically spraying a glaze solution onto a dental prosthesis. The automated spray glazing system includes: a first spray gun; a controller, and a gripper configured to hold the dental prosthesis and to rotate the dental prosthesis about an axis. The controller is configured to rotate the gripper and spray a glaze solution from the first spray gun using a glazing profile based at least in part on a type of the dental prosthesis. The glazing profile is selected such that a cross-sectional thickness of a resulting-glazed material of the dental prosthesis has an average thickness range between 15 to 63 μm and a standard deviation of less than 6 μm when measured at locations in an upper half of the dental prosthesis.

13 Claims, 36 Drawing Sheets

(51) Int. Cl.
*A61C 13/08* (2006.01)
*A61C 13/00* (2006.01)
*A61C 13/09* (2006.01)
*B05B 15/55* (2018.01)
*A61C 8/00* (2006.01)
*A61C 13/083* (2006.01)
*B05B 7/24* (2006.01)
*B05B 1/30* (2006.01)
*B05B 7/12* (2006.01)
*A61C 13/12* (2006.01)

(52) U.S. Cl.
CPC .......... *A61C 13/0006* (2013.01); *A61C 13/09* (2013.01); *B05B 12/004* (2013.01); *B05B 15/55* (2018.02); *A61C 8/0012* (2013.01); *A61C 13/0835* (2013.01); *A61C 13/12* (2013.01); *B05B 1/306* (2013.01); *B05B 7/1263* (2013.01); *B05B 7/2424* (2013.01)

(56) References Cited

U.S. PATENT DOCUMENTS

| | | | | |
|---|---|---|---|---|
| 2004/0081765 | A1* | 4/2004 | Pitts | A61K 6/20 427/376.2 |
| 2005/0170315 | A1 | 8/2005 | Strobel et al. | |
| 2006/0240177 | A1* | 10/2006 | Newkirk | B05D 7/546 427/2.1 |
| 2011/0229842 | A1* | 9/2011 | Bielfeldt | A61B 5/1077 433/29 |
| 2012/0052186 | A1* | 3/2012 | Junglas | B33Y 80/00 427/2.29 |
| 2013/0059272 | A1* | 3/2013 | Jahns | A61K 6/833 433/199.1 |
| 2016/0302896 | A1* | 10/2016 | Miller | B05B 13/0221 |
| 2018/0327319 | A1* | 11/2018 | Li | A61C 13/083 |

OTHER PUBLICATIONS

International Preliminary Report on Patentability and Written Opinion in PCT International Application No. PCT/US2018/059007 dated May 5, 2020 (8 pages).

* cited by examiner

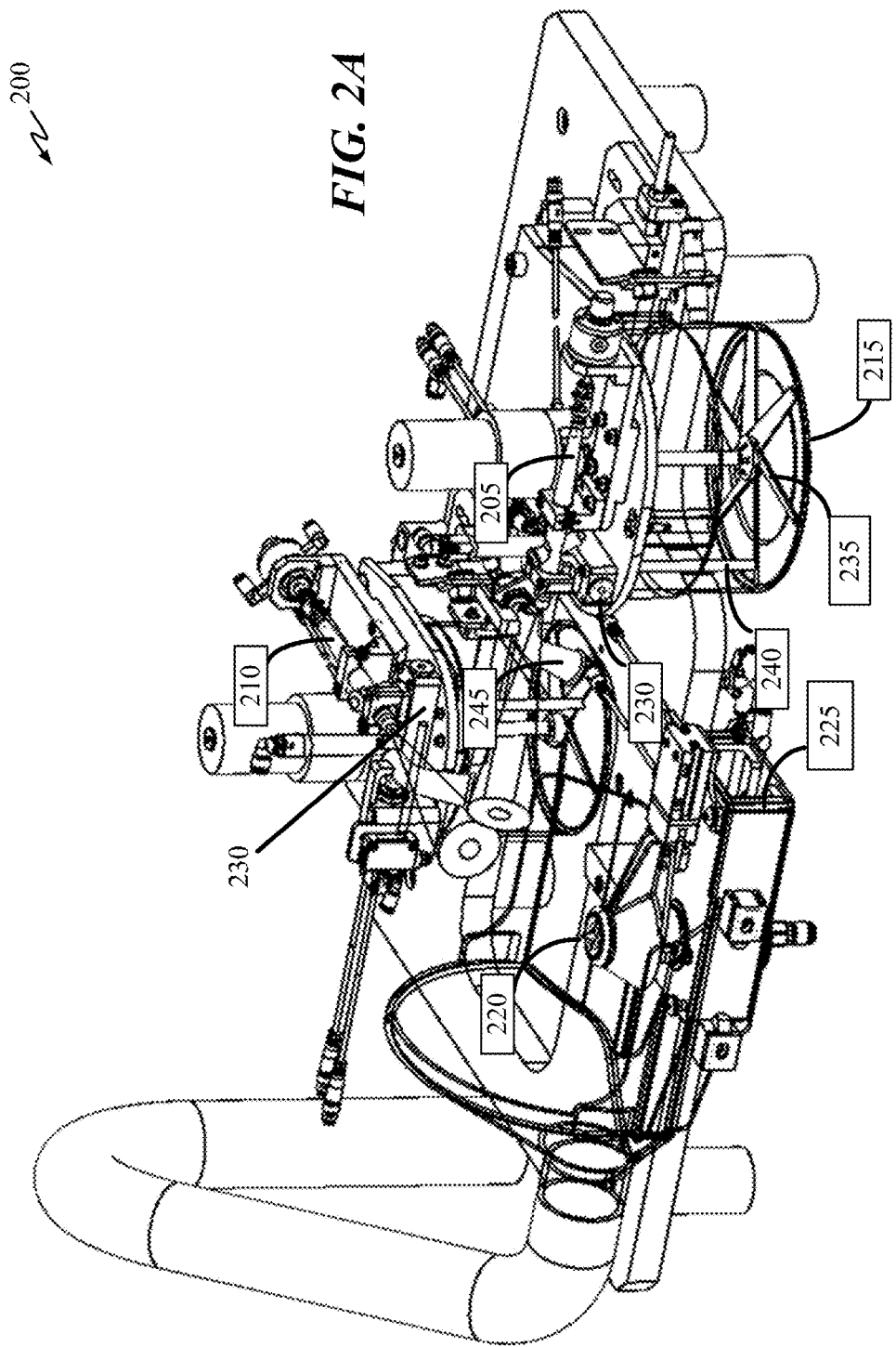

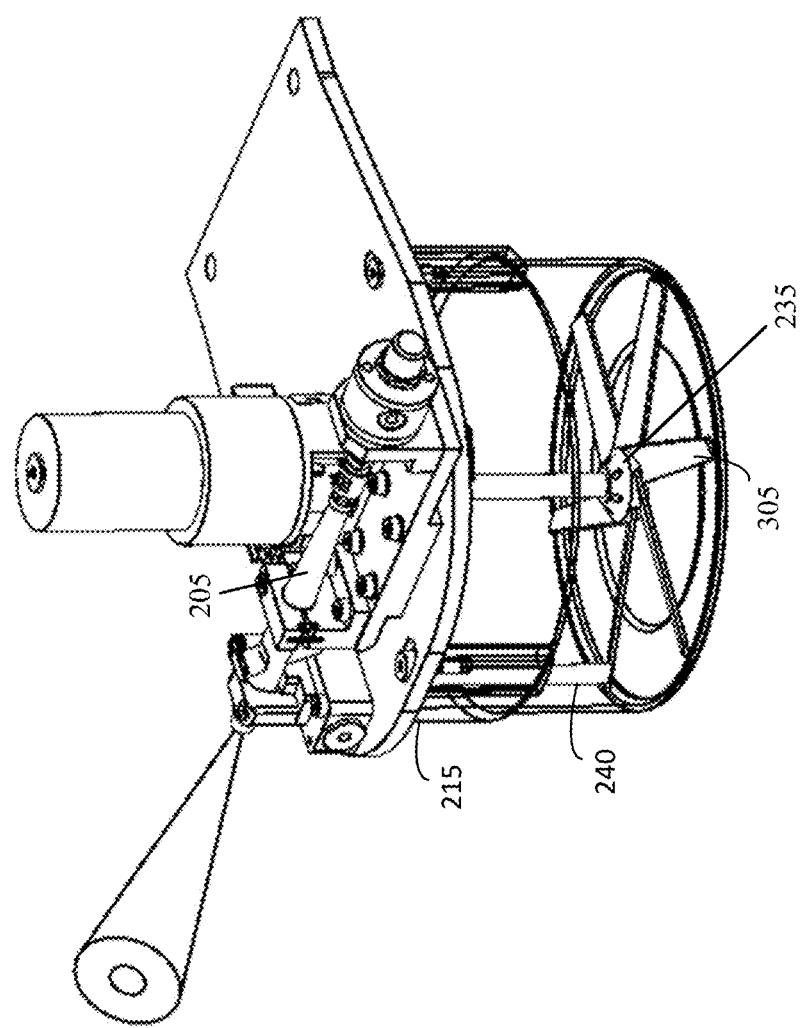

| Crown Type | Gripper RPM | Glaze with First Spray Gun for x Revolution of Gripper | Glaze with Second Spray Gun for x Revolution of Gripper | Glaze with First Spray Gun for x Revolution of Gripper |
|---|---|---|---|---|
| Molar Full Anatomy | 24 | 1.5 | 3 | 2 |
| Molar Flat Anatomy | 24 | 1.25 | 3 | 1.25 |
| Pre Molar | 27.3 | 1 | 3 | 0.75 |
| Anterior | 30 | 1 | 3 | 0.2 |

FIG. 13

500x, location1

Location 2

Location 5

SYSTEMS AND METHODS FOR SPRAY APPLICATION OF GLAZE AND OTHER MATERIALS

CROSS-REFERENCE TO RELATED APPLICATIONS

This present application claims priority to and benefit of U.S. Provisional Application No. 62/580,624, filed Nov. 2, 2017, the disclosure of which is incorporated herein by reference in its entireties for all purposes.

TECHNICAL FIELD

The disclosure relates generally to the field of automated manufacturing processes, and specifically to the automation of processes for the spray application of glaze and other materials to manufactured articles, such as dental prostheses.

BACKGROUND

Recently, CAD/CAM dentistry (computer-aided design and computer-aided manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored with a crown, an inlay, an onlay, a veneer, or other form of restoration. The prepared tooth and its surroundings are then scanned by a three dimensional (3D) imaging camera and the scan data is uploaded to a computer for design. Alternatively, a dentist can obtain an impression of the tooth to be restored and the impression may be scanned directly, or formed into a model to be scanned, and the scan data is uploaded to a computer for design.

Dental prostheses are typically manufactured at specialized dental laboratories that employ computer-aided design (CAD) and computer-aided manufacturing (CAM) milling systems to produce dental prostheses according to patient-specific specifications provided by dentists. In a typical work flow, information about the oral situation of a patient is received from a dentist, and the dentist or dental laboratory designs the dental prosthesis. Where the prosthesis is milled from a block of material, a material block having a size, shape, color, and material-type properties suitable for creating the prosthesis is selected.

After the milling process, the milled material blocks are transformed into rough prostheses which need to be cleaned, sintered, and glazed before they are ready to be delivered to customers. The glazing process is done manually and is labor intensive and involves a lot of variables such as: operator differences, spraying distance, spraying angle, spraying time, glaze solution homogeneity, glaze sintering temperature profile, rate of rotation of the prosthesis, angle of rotation of the prosthesis, clogging of manually operated equipment, and handling. Some of these variables are uncontrollable regardless of how much engineering and quality controls are placed into the manual glazing manufacturing line. For example, over a long period of time, different operators have different working styles and mode of spraying regardless of established standards. Each operator will invariably apply different spraying distances, spraying angles, spraying time, rotation angle, rate of rotation, etc. Not only these variables differ greatly among different operators, they can also differ at the individual operator level. As a result, the dental prosthesis glazing process is very difficult to control and consistent quality across various manual glazing lines is very difficult to achieve. Accordingly, what is needed is an automated glazing process that can produce quality and consistent glazing.

SUMMARY

Disclosed herein are methods and systems used for an automated spray application of glaze and other materials, such as for use when applying spray glaze to a dental prosthesis. The glazing system includes: a first spray gun; a gripper configured to hold the dental prosthesis and to rotate the dental prosthesis about an axis; and a controller.

The controller is configured to rotate the gripper and to spray a glaze solution from the first spray gun using a glazing profile that is based at least in part on the type of the dental prosthesis. The glazing profile is designed such that a cross-sectional thickness of the resulting-glazed material of the dental prosthesis can have an average thickness greater than 12 µm and a standard deviation of less than 2.5 µm. In some embodiments, the glazing profile is configured to control the gripper and the first spray gun based at least in part on the type of the dental prosthesis. In some embodiments, the average thickness and the standard deviation are calculated from thickness measurements measured at three or more locations of the cross-section portion of the dental prosthesis. The cross-sectional thickness of the resulting-glazed material of the dental prosthesis can have a thickness variance of less than 6 µm.

The glazing system can also include a second spray gun. The first and second spray guns can be positioned to spray the glaze solution at the dental prosthesis from different angles and spray velocity. The controller is configured to spray the glaze solution from the first and second spray guns using the glazing profile that is based at least in part on the type of the dental prosthesis. The glazing profile can comprise a rotation profile configured to: rotate the gripper in a first direction while the glaze solution is sprayed from the first spray gun; and rotate the gripper in a second direction while the glaze solution is sprayed from the second spray gun.

The second spray gun can be placed at an angle with respect to the first spray gun. In some embodiments, the angle between the first and second spray gun is 90°. The distances between the first and second spray guns to the gripper can be the same. In some embodiments, the distances between the first and second spray guns to the gripper can be different. The flow rate for each of the spray guns can be the same or different. In some embodiments, the flow rate of each spray gun is controlled by a glazing profile that can control one or more attributes of each spray gun (e.g., spraying speed, spraying angle, and spraying purge cycle.

The present disclosure further describes methods for automated spray application of glazes and other materials. A representative method for automated spray application of a glaze material to a dental prosthesis includes: securing the dental prosthesis with a gripper coupled to a platform; rotating the gripper at a certain rate of rotation (e.g., revolutions per minute); and applying the glaze solution to the dental prosthesis using the first spray gun while the gripper is rotating. The method further includes tilting the platform at a predetermined angle prior to spraying a glaze solution at the dental prosthesis; and using a second spray gun to spray the glaze solution at the dental prosthesis while it is being tilted and rotated by the platform and the gripper, respectively.

The present disclosure further describes a method for applying glaze to a dental prosthesis, the method comprising: securing the dental prosthesis with a gripper; rotating the gripper according to a glazing profile configured to control a rotation of the gripper based at least on a type of the dental prosthesis; and applying, using a first spray gun, a glaze solution to the dental prosthesis according to the glazing profile such that the glazing profile generates a cross-sectional thickness of a resulting-glazed material of the dental prosthesis to have an average thickness greater than 12 μm and a standard deviation of less than 2.5 μm. The glazing profile is configured to apply the glaze solution using the first spray gun based at least in part on the type of dental prosthesis.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 2A is a perspective view of an automated glazing system in accordance with some embodiments of the present disclosure.

FIG. 3A is a top perspective view of a spray gun and container assembly in accordance with some embodiments of the present disclosure.

FIG. 13 is a table illustrating a plurality of glazing profiles in accordance with some embodiments of the present disclosure.

DETAILED DESCRIPTION

Systems and methods for the automated spray application of glaze and other materials, such as used for spray glazing a dental prosthesis, are provided below. In the following description, for purposes of explanation, numerous specific details are set forth to provide a thorough understanding of the described systems and methods. However, it will be apparent to one skilled in the art that the described systems and methods can be practiced without these specific details. In other instances, structures and devices are shown in a block diagram form in order to avoid obscuring the described systems and methods.

Overview

Figure 1:
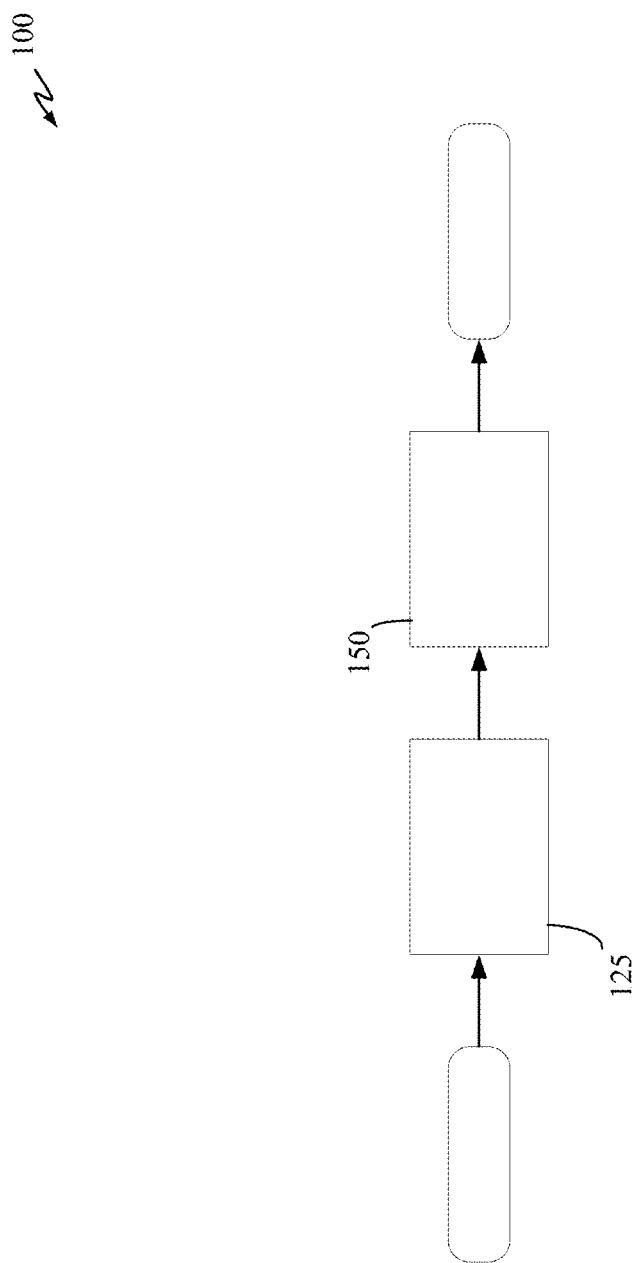
FIG. 1 is a high-level block diagram of a system for manufacturing dental prostheses in accordance with some embodiments.

FIG. 1 illustrates a manufacturing process 100 for manufacturing dental prostheses in accordance with some embodiments of the disclosure. Process 100 includes two main processes, a data collection process 125 and a manufacturing process 150. On a high level, FIG. 1 illustrates data collection process 125 that includes taking and generating an order for dental prostheses. The data collection process includes obtaining a patient's dentition data in order to manufacture customized dental prostheses for the patient.

The data collection step can also include a scanning step to generate scan data (which can include both 2D and 3D data) of the patient's dentition. The patient's dentition scan data ("dentition data") can be obtained via optical scanning, CT scanning, or other form of scanning of a representative model of the patient's dentition. Dentition data can also be obtained by directly scanning various portions of the patient's mouth. For example, dentition data of the patient's jaw can be obtained by a direct intraoral scan of the patient's teeth. This typically takes place, for example, in a dental office or clinic and is performed by a dentist or dental technician. Dentition data can also be obtained indirectly by scanning an impression of the patient's teeth, by scanning a physical model of the patient's teeth, or by other methods known to those skilled in the art.

FIG. 1 also illustrates the dental prosthesis manufacturing process 150, which can include milling, cleaning, inspecting, sintering, glazing, and sandblasting. Process 150 can repeat one or more of these processes at various stages of the production. For example, the cleaning process can be done after the milling process and the cutting process. The milling process is where a rough dental prosthesis is milled from a material block. The cutting process is where the rough the dental prosthesis is cut free from the material block. Additionally, the sintering process can be done after the pre-coloring process and also after the glazing process.

Manufacturing process 150 can include a manual glazing process and an automated glazing process. In production, both the manual and auto glazing processes can be used to increase production throughput. As previously mentioned, a manual glazing process is very labor intensive, and consistent quality is difficult to achieve even with the application of guidelines and standardized techniques. The manual glazing process has a lot of hard-to-control and uncontrollable variables that make achieving consistent quality very difficult. Some of these variables are operator differences, spraying distance, spraying angle, spraying time, glaze solution homogeneity, glaze sintering temperature profile, glaze solution mixing rate, glaze solution mixing time, glaze solution transfer mode and rate, rate of rotation of the prosthesis, angle of rotation of the prosthesis, operator's fatigue, dental prosthesis handling, etc.

Currently, there are many guidelines and standardized instructions to performing each step of the manual glazing process. However, typically, differences in operators' style and techniques will dominate the manual glazing process regardless of how much oversight is performed. For example, each operator will develop their own style and apply their own judgement as to when a glaze solution is properly mixed and at what speed the spinner should be set. Each operator will spray a dental prosthesis at different angles, distances, and durations. The variations can appear within each individual operator due to factors such as time of day, fatigue, and concentration, to name a few. As a result, the dental prosthesis glazing process is very difficult to control and consistent quality from each manual glazing line and across different manual glazing lines is very difficult to achieve.

FIG. 2 illustrates a system 200 for automated glazing a dental prosthesis in accordance with some embodiments of the present disclosure. System 200 is designed to remove almost all (if not all) of the variabilities that are inherent in the manual glazing process. System 200 includes one or more spray guns 205 and 210, one or more glaze solution containers 215, a gripper 220, a pivotable platform 225, and one or more glazing-purging (GP) blocks 230.

Spray guns 205 and 210 of system 200 can be fixed during spraying process while pivotable platform 225 is tilted at a predetermined angle. In some embodiments, spray guns 205 and 210 can be mounted to a moveable stage, which can be controlled to move along a predetermined trajectory. For example, one or more of spray guns 205 and 210 can be programmed to move along an arc-like trajectory, with respect to gripper 220, by moving the moveable stage in a similar manner. In some embodiments, one or more of spray guns 205 and 210 can be programmed to move along a line trajectory or other types of trajectory.

The dental prosthesis can be held in place by gripper (e.g., holder) 220, which is secured to pivotable platform 225 such that whenever platform 225 is pivoted at an angle, the dental prosthesis is also pivoted by the same angle. In some embodiments, pivotable platform 225 is pivoted by 45° while a glaze solution is applied to the dental prosthesis. In some embodiments, pivotable platform 225 can be pivoted at an angle range of 15-75° during the glaze solution application process. In some embodiments, gripper 220 can remain stationary as one or more of spray guns 205 and 210 can move with respect to gripper 220 during the glazing process.

To eliminate variability in the spraying distance, both of the spray guns 205 and 210 can be fixed at a distance away from gripper 220, which is where the dental prosthesis is being held during the glaze application process. Both of the spray guns can be fixed at the same distance to gripper 220. Alternatively, the spray gun 205 is fixed at a distance different than the distance in which the second spray gun 210 is affixed. For example, the distance between gripper 220 to first spray 205 gun can be between 5-7 inches, and the distance between gripper 220 to second spray gun 210 can be between 6-8 inches. In some embodiments, the distance between gripper 220 to spray gun 205 can be 6.275 inches, and the distance between gripper 220 to second spray gun 210 can be 7.125 inches.

To eliminate the variability in spraying time and the amount of glaze solution being applied to a dental prosthesis, the spraying time of the glaze solution can be closely controlled. In addition, the flow rate and/or spray velocity of the glaze solution of each gun can also be controlled and frequently calibrated to ensure consistency in the flow rate and/or spray velocity. In some embodiments, both of spray guns 205 and 210 are designed to have the same flow rate and/or spray velocity output. Alternatively, the flow rate and/or spray velocity outputs of both spray guns 205 and 210 can be different. In some embodiments, the spray velocity as measured at a distance that is 2 inches from the exit nozzle of the spray gun 205 can be from 3.8-4.0 meter per second, and the spray velocity as measured at a distance that is 2 inches from the exit nozzle of the second spray gun 210 can be 4.5-4.7 meter per second. The spray velocity as measured at a distance of 2 inches from the exit nozzle of each of the spray guns 205 and 210 can range between 2-7 meters per second. In some embodiments, the flow rates and/or spray velocities of the glaze solution of both spray guns 205 and 210 are the same.

The flow rate and/or spray velocity of each spray gun can be controlled by manipulating the length and shape of the repositionable rod/needle (see FIG. 5) within the lumen of the spray gun. Prior to each spray gun being cleared for use in the glazing process, each spray gun can be calibrated to have a certain flow rate (i.e., output a desired volume of glaze solution per unit time) and/or a certain spray velocity (i.e., output a spray having a desired speed as measured using an anemometer). The repositionable rod can be modified to adjust the flow rate and/or spray velocity. For example, the length of the rod and the shape of the tip or cone of the rod can be varied to increase the space between the rod and the exit nozzle of the spray gun. A more detailed discussion of the spray gun and the repositionable rod is provided below.

In some embodiments, spray guns 205 and 210 can be ultrasonic spray guns having ultrasonic nozzles similar to the nozzles produced by Sono-Tek. Ultrasonic nozzles do not rely on the Venturi effect to deliver the glaze solution. Instead, ultrasonic nozzles rely on ultrasonic vibrations at the nozzles to atomize the glaze solution and deliver an atomized glaze mist to the dental prosthesis in a low-velocity and low-pressure conditions. In the ultrasonic nozzle embodiment, the glazing-profile (e.g., rate of rotation, glazing time, glazing angle, glaze velocity, etc.) used for glazing a dental prosthesis can be different than the glazing-profile implemented with Venturi-based spray guns. Additionally, the purging and cleaning cycle can also be different or remain substantially the same.

In the ultrasonic spray guns embodiments, the flow rate and/or spray velocity of each spray gun can be controlled by adjusting the frequency and amplitude of the vibration being delivered to the ultrasonic nozzle, which can be generated by a piezoelectric transducer. In some embodiments, the shape and size of the exit orifice of the ultrasonic nozzles can be selected to achieve a specific flow rate and velocity. For example, to increase the flow rate, the rate of vibration can be increased and/or the exit orifice can be made smaller.

In the manual glazing process, the dental prosthesis is twisted, turned, or rotated by hand while the glaze solution is being applied via a manually operated spray gun. The rotation of the dental prosthesis allows the glaze to be distributed around the dental prosthesis and thereby fully covering the dental prosthesis with the glaze solution. However, each operator will typically rotate the dental prosthesis at different rates and angle. To eliminate this variability, gripper 220 of system 200 can be programmed to rotate at a predetermined rate while the dental prosthesis is being sprayed with the glaze solution. In some embodiments, the rate of rotation is 15 rotations per minute. Depending on the types of dental prosthesis, shapes, sizes, or types of glaze solution used, gripper's 220 rate of rotation can range between 10-20 rotations per minute.

In some embodiments, system 200 can employ a vision system (not shown) to identify one or more attributes of the dental prosthesis being placed on the gripper. Based on the vision system's analysis and/or manual data input, system 200 can select a spraying profile specifically designed for the of dental prosthesis being detected or selected. For example, if the dental prosthesis is determined to be a molar with full anatomy, the controller (not shown) can select a certain spraying profile designed specifically for glazing a molar with full anatomy. For instance, gripper 220 can be rotated at a rate of 0.4 revolution per second while spray gun 205 can be activated to spray glaze for 1.5 revolution. Next, spray gun 210 can be activated to spray glaze for 3 revolutions. Finally, spray gun 205 can be activated again to spray glaze for 2 revolution to finish the glazing sequence. In some embodiments, system 200 can begin to glaze another dental prosthesis or activate a purge sequence to clean spray guns 205 and 210 and/or GP blocks 230.

In some embodiments, the spraying time for each spray gun can be the same. Alternatively, the spraying time for the first and second spray guns 205 and 210 can be different. In some embodiments, spray gun 205 can be activated to spray for half of a revolution of the dental prosthesis, then second spray gun 210 can be activated to spray for 2 revolutions of the dental prosthesis. Immediately after the second overall spray by second spray gun 210, spray gun 205 can spray again for another half a revolution. In this embodiment, the dental prosthesis is sprayed at two different angles for a total of 3 revolutions. It should be noted that other spray-revolution schedules can be adopted. For example, second spray gun 210 can spray first for 1 revolution, then spray gun 205 can spray for 0.75 revolution, next second spray gun 210 can spray again for another complete revolution, and finally first spray gun can spray again for 0.25 revolution. The total number of revolutions of the dental prosthesis at each spraying stage can range between 0.25-3 revolutions.

The glaze solution is a naturally non-homogeneous solution that is made of fine ceramic particles suspended in a solution such as isopropyl alcohol (99%) or other inert solution. Fine ceramic particles are heavy and are insoluble solids. As a result, the glaze solution must be stirred regularly to keep the solution as homogeneous as possible right before it is sprayed. In the manual glazing process, a flask of glaze solution is stirred using a magnetic stirrer. The solution is constantly stirred until it is transferred to a dispensing vial, which is coupled to the spray gun. Ideally, the density (concentration) of the glaze solution can be controlled using standardized mixing rate and time. However, operators can operate a magnetic mixer at different rates and durations, which can lead to different concentration of fine ceramic particles in the glaze solution. To eliminate this variability, glaze solution container 215 includes a mixer 235 that constantly agitates the glaze solution. Container 215 can include a blade near the bottom of mixer 235. The blade can be positioned very close to the bottom of container 215. In some embodiments, the blade is positioned approximately $\frac{1}{16}$ of an inch from the bottom of container 215. In addition, the diameter of the blade is sized such that it is $\frac{1}{16}$ of an inch from the side wall of container 215, which can be a round container. To further increase the consistency of the concentration of the glaze solution being applied to the dental prosthesis, the intake-pipe of each spray gun reaches near the mixing blade where the solution is the most homogeneous as it is being constantly agitated at the same rate. The blade of mixer 235 can have a rate of rotation between 15-35 rotation per minute (RPM). In some embodiments, mixer's 235 rate of rotation can be 25 RPM.

As shown in FIG. 3A, glaze solution container 215 is located directly below spray gun 205. An intake pipe 240 provides fluidic connection between spray gun 205 and container 215. This set up minimizes the fluid travel distance between spray gun 205 and container 215. Keeping the travel distance to a minimum is advantageous because, as there is no agitation in the intake pipe 240, the ceramic powder contained in the glaze solution will tend to sink and agglomerate inside the intake pipe 240. In other words, a long intake pipe 240 can create problems and is harder to clean than a shorter intake pipe 240.

Spray guns 205 and 210 in system 200 can be a Venturi-effect based air gun similar to the spray gun used in the manual glazing process; however, the spraying angle, spraying time, distance to the dental prosthesis, travel trajectory, and the flow rate of spray guns 205 and 210 are closely controlled to remain consistent over many glazing cycles. In this way, many of the variabilities caused by the manual operation of the spray gun in the manual glazing process can be reduced or entirely eliminated. As previously mentioned, spray guns 205 and 210 can also be ultrasonic spray guns whose spraying angle, spraying time, spray distance, flow rate, and travel trajectory are also monitored and controlled by the controller.

GP block 230 enables system 200 to clear out any glaze solution residue in the nozzle, lumen, inlets, and outlets of the spray gun (e.g., gun 205 or 210). GP block 230 includes a piston (see FIG. 7) that can be actuated in two positions. In the first position, the GP block 230 allows the spray gun to operate normally by allowing glaze solution from container 215 to enter the spray gun and out of the exit nozzle via the Venturi effect. Further, in the first position, a cleaning fluid is allowed to enter a fluid passage via a fluid inlet and into an external fluid reservoir. In some embodiments, the external fluid reservoir can be located on GP block 230. The external fluid reservoir is used to store a predetermined volume of cleaning fluid necessary to clean the lumen and/or the exit nozzle of the spray gun. The cleaning fluid in the reservoir is emptied when the piston is actuated from the first position to the second position, which is the purging position.

In the second position, the glaze solution inlet is blocked and the intake pipe 240 of the glaze solution blasted with pressured air to push any remaining glaze solution in the intake pipe 240 back to container 215. Further, in the second position, the fluid inlet is closed. However, at the second position, the fluid passage is moved and a path is created connecting the exit nozzle of the spray gun, the fluid passage, and the fluid reservoir. While the piston is in the second position, the cleaning fluid from the reservoir is pushed through the spray gun and out of the exit nozzle. This action removes any glaze solution residue in the spray gun. A waste solution collector 245 is also provided during the cleaning process. Waste solution collector 245 can be moved into the path of the spray gun each time the cleaning process is started. Once the cleaning process is completed, the waste solution collector can be retracted and out of the way.

Figure 2B:
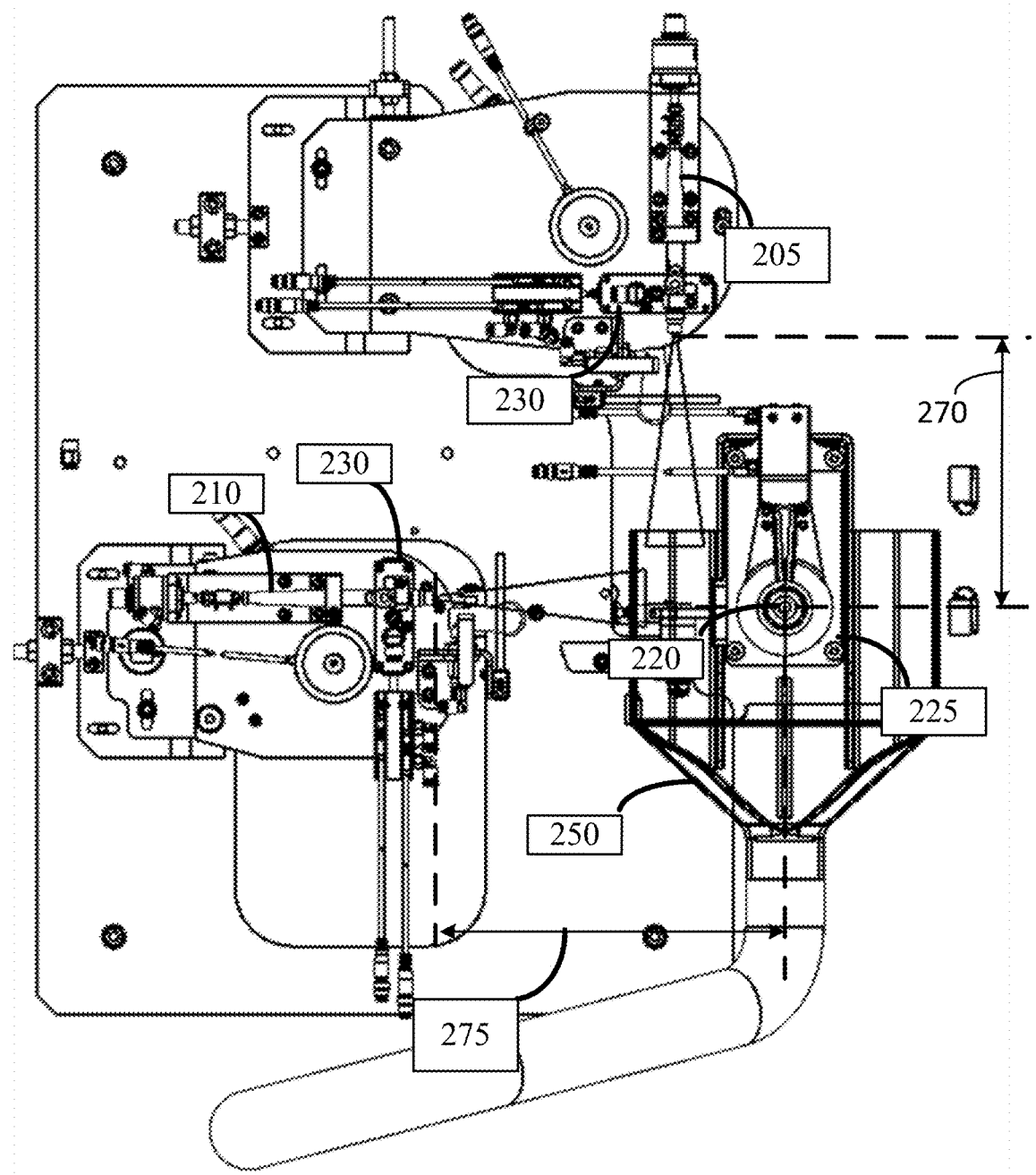
FIG. 2B is a top view of the automated glazing system in accordance with some embodiments of the present disclosure.

FIGS. 2A-2B illustrate system 200 while at rest or in between a glazing cycle. In other words, pivotable platform 225 is in a non-pivoted or horizontal position. During a glazing cycle, pivotable platform 225 can be pivoted or rotated such that the gripper 220 holding the dental prosthesis is positioned at an angle between 15-60° with respect to the horizontal plane of system 200. In some embodiments, pivotable platform 225 can be pivoted by 45° during a glazing cycle. System 200 also includes a main waste solution collector 250 that partially envelops the gripper 220. Main waste solution collector 250 can be connected to a vacuum to generate air flow into the waste solution collector.

FIG. 2B is a top view of system 200. As shown, the first and second spray gun 205 and 210 can be positioned perpendicular to each other. In other embodiments, however, an angle between the first and second spray gun 205 and 210 can be between 45-135°. As previously mentioned, the distance between spray gun 205 and gripper 220 can be between 5-7 inches, and the distance between second spray gun 210 and gripper 220 gun can be between 6-8 inches. As shown in FIG. 2B, in some embodiments, a distance 270 can be 6.275 inches, and a distance 275 can be 7.125 inches.

FIG. 3A is a perspective view of spray gun 205 and glaze solution container 215 in accordance with some embodiments of the present disclosure. Glaze solution container 215 is located directly below spray gun 205 in order to minimize the travel distance of the glaze solution. In some embodiments, glaze solution container 215 can be located above spray gun 205. Alternatively, glaze solution container 215 and spray gun 205 can be located side by side each other.

Glaze solution container 215 includes mixer 235 having two or more blades 305. In some embodiments, mixer 235 can have six blades 305. The length of each blade can be selected such that the outer most edge of the blade 305 is approximately 1/16 inch away from the inner wall of glaze solution container 215. Blade 305 can also be positioned 1/16 inch above the bottom surface of glaze solution container 215. In this way, agglomeration of ceramic particles can be prevented. Mixer 235 also includes a shaft, which is connected to an electric motor. Because the ceramic particles are heavy and tend to settle down at the bottom, mixer 235 can constantly rotate to keep the glaze solution reasonably homogeneous. In some embodiments, mixer 235 can rotate at a rate between 15-35 RPM. In some embodiments, the rate of rotation of mixer 235 is 25 RPM.

Figure 3B:
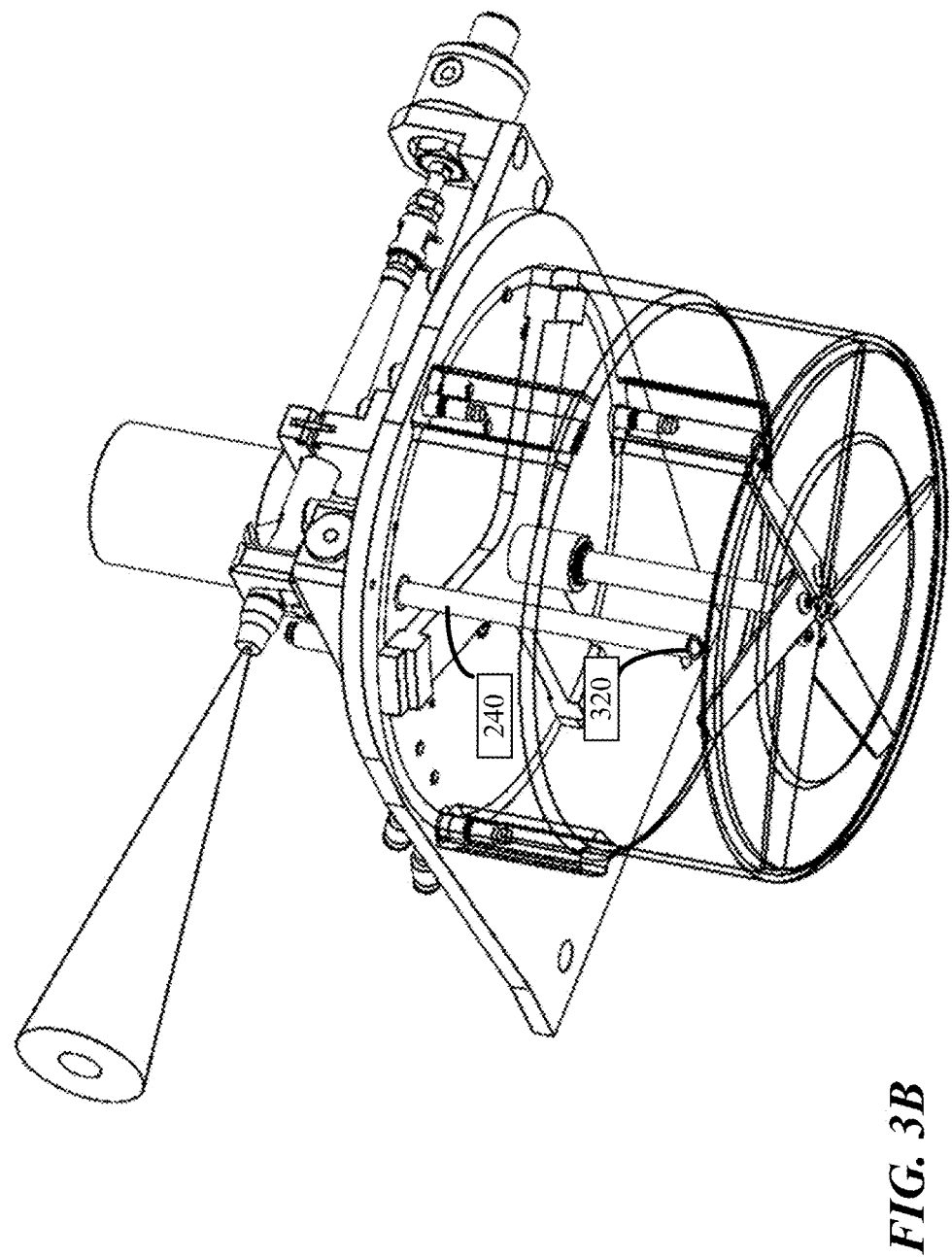
FIG. 3B is a bottom perspective view of a spray gun and container assembly in accordance with some embodiments of the present disclosure.

FIG. 3B illustrates a perspective view of glaze solution container 215 from the bottom. Intake pipe 240 enables the glaze solution to travel to spray gun 205 via GP block assembly 230. Once the glaze solution reaches spray gun 205 it enters an internal mixing chamber (not shown) of spray gun 205. There, the glaze solution is mixed with pressurized air before exiting the exit nozzle of spray gun 205. Intake pipe 240 includes an intake port 320 located near the bottom surface of glaze solution container 215 but above the blades 305 where the concentration of the ceramic particles is desirable. In some embodiments, the length of intake pipe 240 is selected such that intake port 320 is approximately in the middle of glaze solution container 215. In other words, if glaze solution container 215 has a depth of six inches, then intake port 320 can be located at a depth of three inches.

Figure 4:
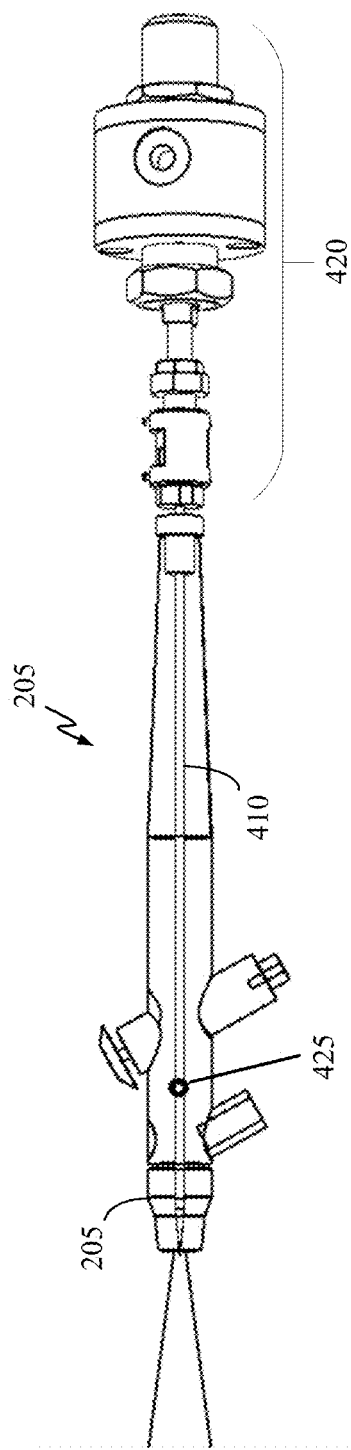
FIG. 4 is a side view of a spray gun used in an automated glazing system in accordance with some embodiments of the present disclosure.

FIG. 4 illustrates spray gun 205 used in system 200 in accordance with some embodiments of the present disclosure. Each spray gun used in system 200 can be similar or the same as spray gun 205 as described here. Spray gun 205 can be a Venturi air gun with a repositionable or retractable rod 410 within the lumen of spray gun 205. The diameter and length of repositionable rod 410 can be adjusted to manipulate the flow rate of spray gun 205. Prior to the glazing process, each spray gun can be calibrated by adjusting the position of the repositionable rod until the desired flow rate and/or spray velocity is achieved. Spray velocity can be measured by placing an anemometer at a location that is 2 inches from the exit nozzle of the spray gun and then measuring the velocity of the air (without glaze or other liquid materials) as it exits the spray gun 205. The spray velocity for spray gun 205 can be between 2-7 meter/sec, such as between 3-6 meter/sec, or such as between 4-6 meter/sec.

Repositionable rod 410 is coupled to an axial actuator 420 that can retract repositionable rod 410 by a distance of about 8 mm in the embodiment shown. During normal spraying operation, rod 410 is in a forward (non-retracted) position as shown in FIG. 4. During the cleaning operation, actuator 420 is actuated to retract rod 410. This creates a large space between the tip of rod 410 and the exit nozzle of spray gun 205. The large space would free up any glaze residue that may have hardened between glazing cycles. Once rod 410 is retracted, spray gun 205 is cleaned by allowing pressurized air to spray out. Retracting the repositionable rod 410 also allows the remaining glaze solution to siphon back into the container 215 after each spray application. This helps to prevent the ceramic powder contained in the glaze solution from settling inside the spray gun 205 and at the exit nozzle.

In some embodiments, spray gun 205 also include an orifice 425 positioned on the side of spray gun 205.

Figure 5:
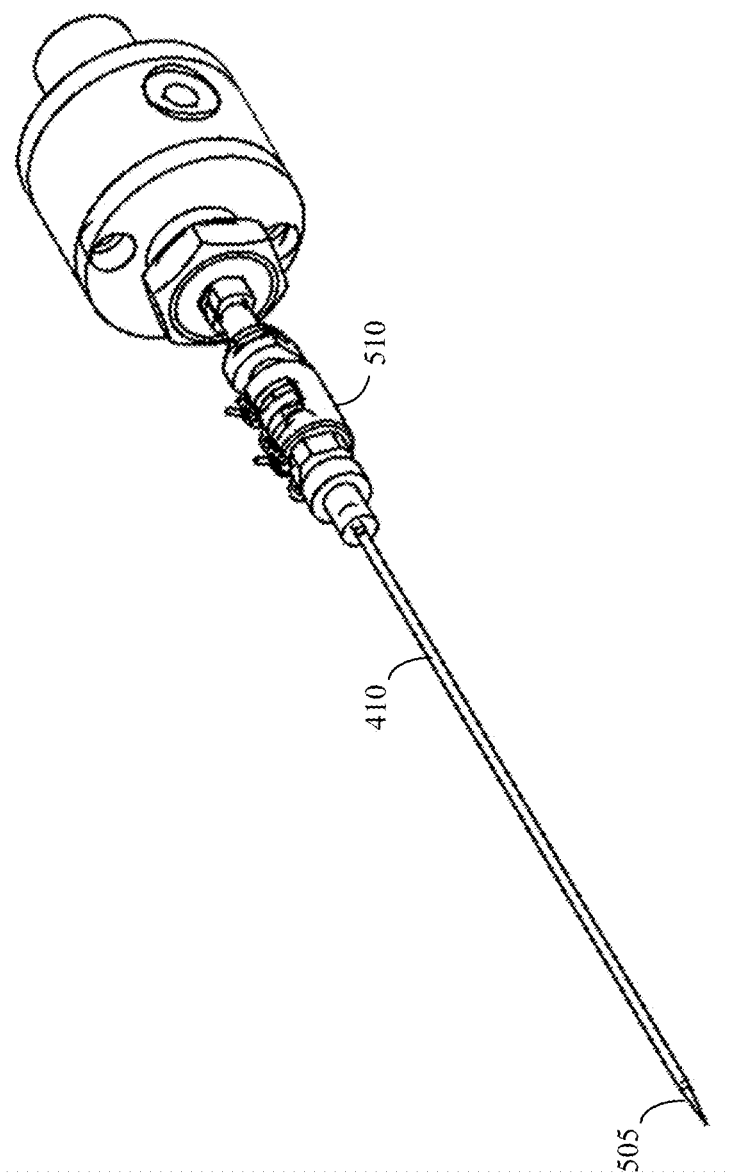
FIG. 5 is a perspective view a repositionable rod within a spray gun in accordance with some embodiments of the present disclosure.

FIG. 5 is a perspective view of repositionable rod 410 in accordance with some embodiments of the present disclosure. Rod 410 includes a tip portion 505 that is shaped like a cone. As mentioned, the length of the cone-shaped tip portion can be adjusted to manipulate the flow rate of the air gun during the calibration process. For example, tip portion 505 can be made longer and more pointy. As a further example, tip portion 505 can be made shorter and more blunt. In some embodiments, rod 410 is coupled to a C-clamp 510 that couples rod 410 to axial actuator 420. In some embodiments, axial actuator 420 can be actuated using pressured air. Alternatively, a step motor can be used to actuate axial actuator 420.

Figure 6:
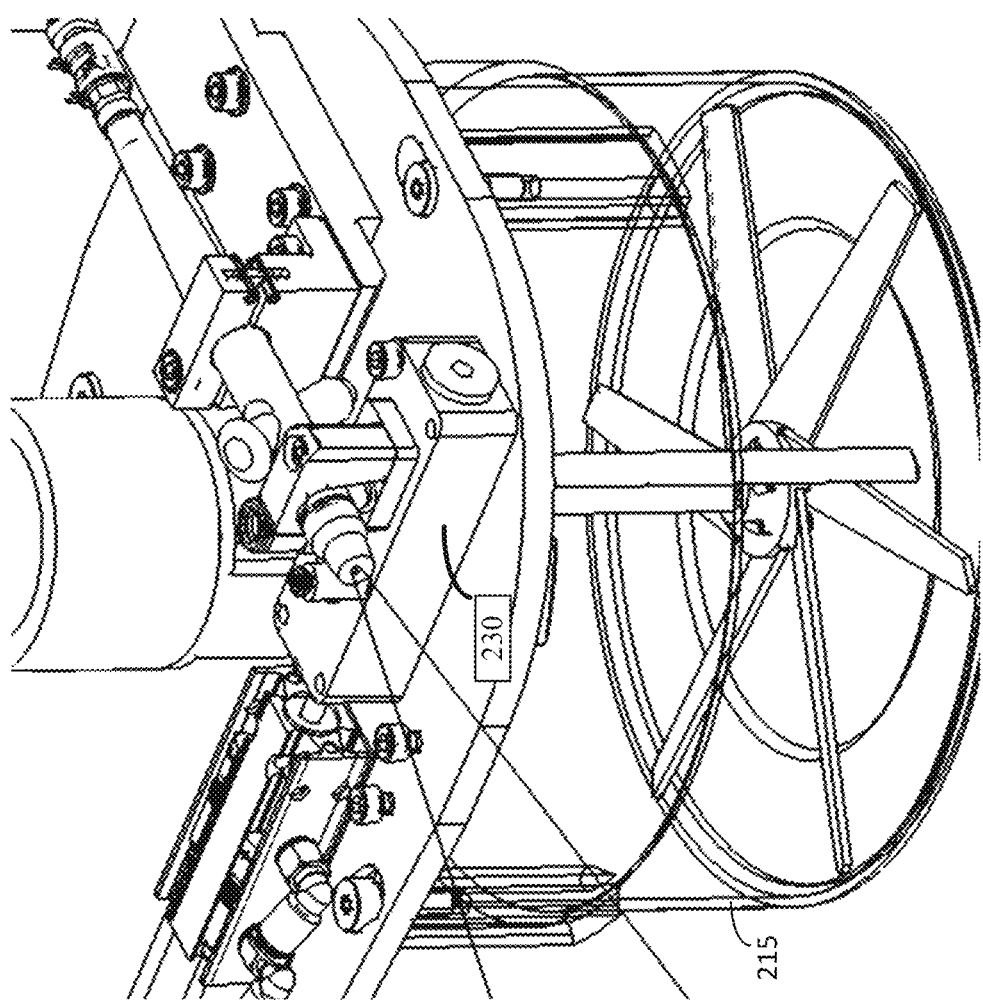
FIG. 6 is a perspective view of a glazing-purging (GP) block installed on a spray gun-container assembly in accordance with some embodiments of the present disclosure.

FIG. 6 is a perspective view of spray gun 205, glaze solution container 215, and GP block 230 in accordance with some embodiments of the present disclosure. GP block 230 has two main functions. The first function is to provide a passage for the glaze solution from container 215 to enter the internal mixing chamber (not shown) of spray gun 205. The second function of GP block 230 is to enable a cleaning fluid and pressurized air to clear the internal components (e.g., mixing chamber, lumen, and exit nozzle) of spray gun 205.

Figure 7B:
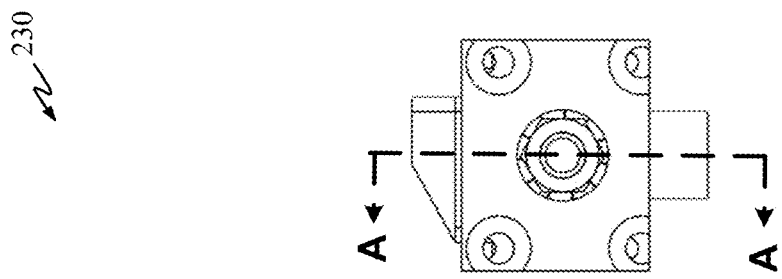
FIG. 7B is a side view of a GP block shown in FIG. 7A.
Figure 7A:
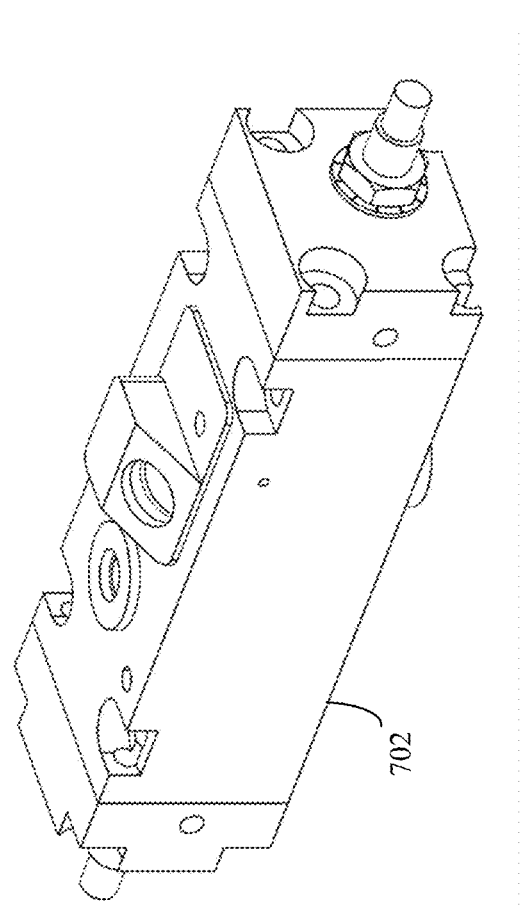
FIG. 7A is a sectional and perspective view of a GP block in accordance with some embodiments of the present disclosure.
Figure 7C:
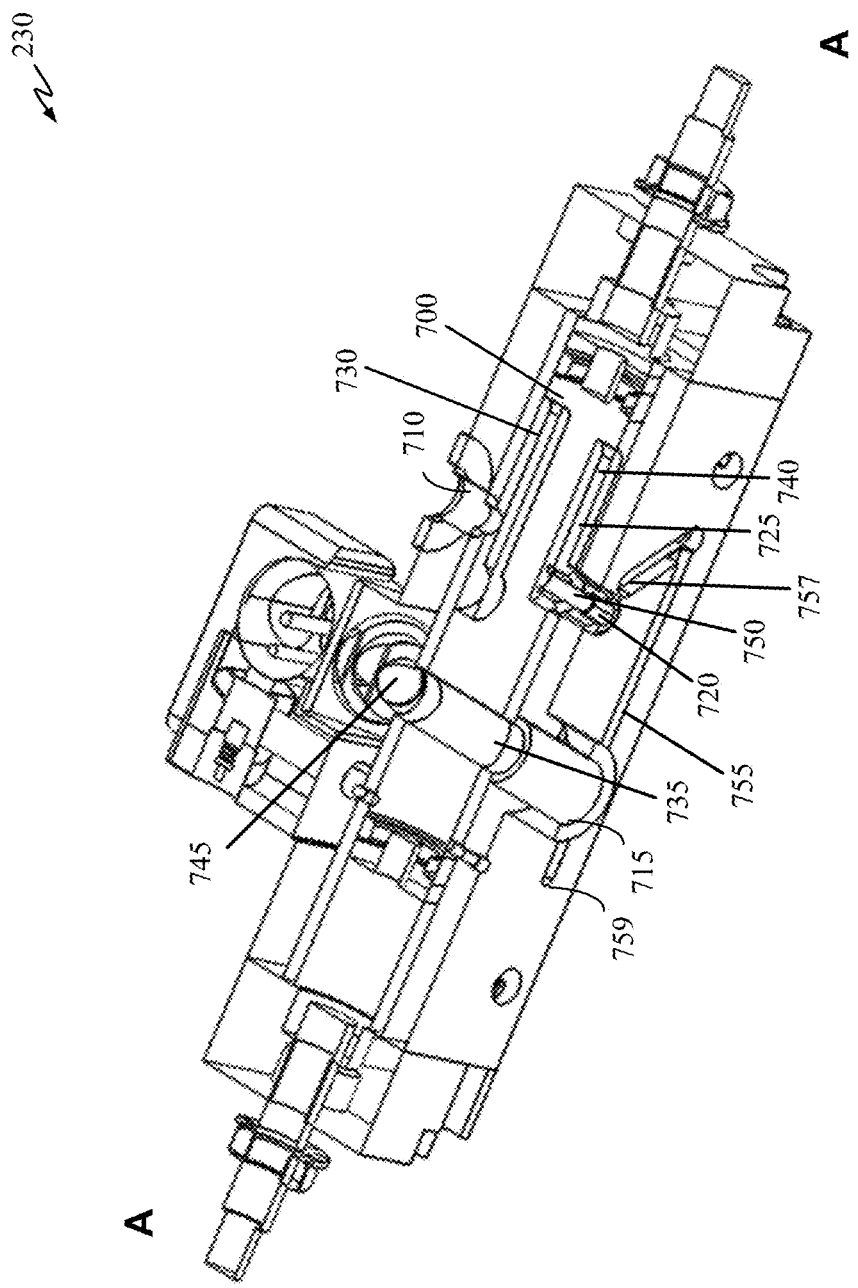
FIG. 7C is a sectional and perspective view of the GP block, shown in FIG. 7B at sectional plane A, in the spray position in accordance with some embodiments of the present disclosure.
Figure 7D:
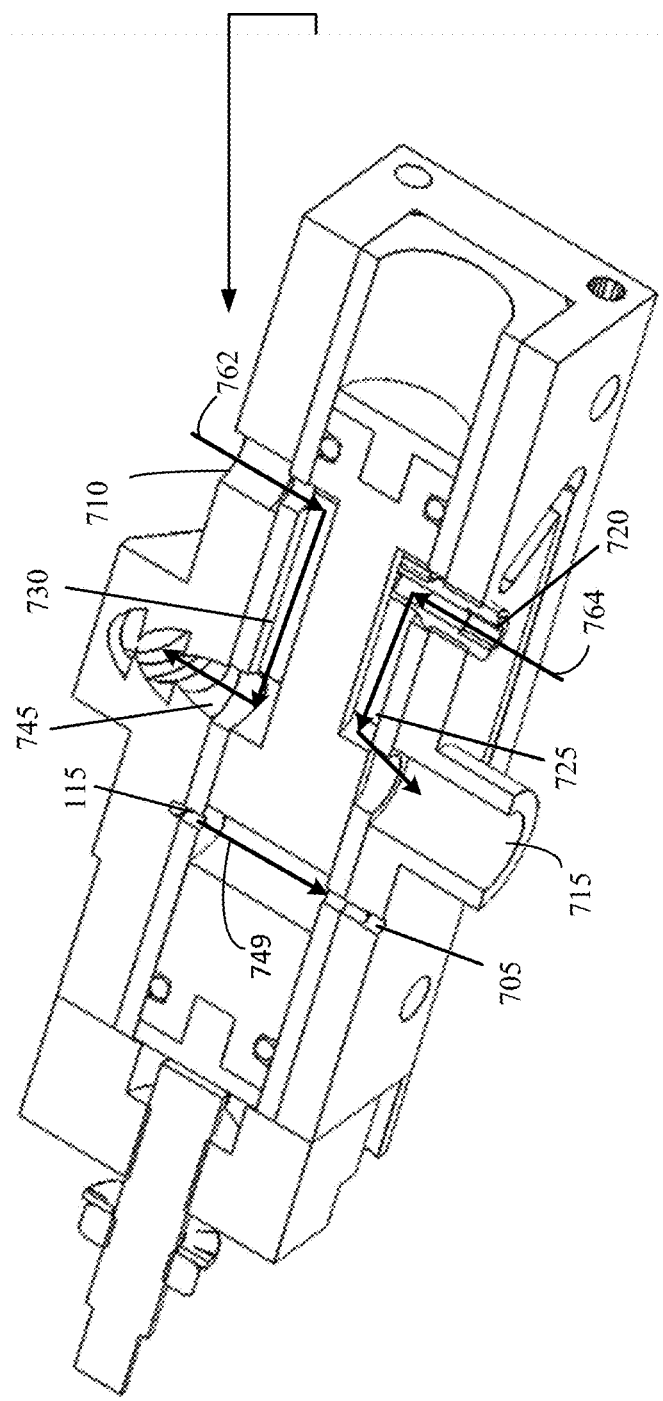
FIG. 7D is a sectional and perspective view of the GP block, shown in FIG. 7B at sectional plane A, in the purge position in accordance with some embodiments of the present disclosure.

FIG. 7A is a perspective view of the GP block 230 that includes the block outer housing 702 and a moveable piston (hidden from view, see FIG. E). FIG. 7B is a side view of GP block 230 and FIGS. 7C and 7D are sectional views of GP block 230 in accordance with some embodiments of the present disclosure. FIG. 7C shows moveable piston 700 in the first position during the glazing cycle. FIG. 7D shows piston 700 in the second position during the purging (e.g., cleaning) cycle. To better illustrate the functionality of GP block 230, FIGS. 7C & 7D will be discussed concurrently. During a glazing cycle, piston 700 is in the first position as shown in FIG. 7C. In this position, the glaze solution from container 215 is allowed to move through glaze solution port 715 and to spray passage 735, which is fluidically coupled to spray gun 205. Through the Venturi effect, the glaze solution is drawn up from container 215 into the internal mixing chamber (not shown) of spray gun 205 and is mixed with pressurized air. The air and glaze solution mixture is then forced out of the exit nozzle in a cone like shape (as shown in FIG. 2A).

Referring to FIG. 7C, GP block 230 includes a cleaning fluid port 710, a glaze solution port 715, an air inlet 720, and piston 700, which includes an air passage 725, a fluid passage 730, and a spray passage 735. Air passage 725 can receive pressurized air from air inlet 720. Air passage 725 can further include a slot 740 on the upper wall of air passage 725. Slot 740 can have a smaller width than air passage 725. Slot 740 is designed to prevent an air source attachment 750 coming in from air inlet 720 to be fully pressed against the upper wall of air passage 725. Without slot 740, air supply from air source attachment 750 can be blocked by the upper wall of air passage 725, slot 740 can provide an unobstructed passage for the air to travel through air passage 725 regardless of the position of air source attachment 750. As illustrated in FIG. 7C, air passage 725 and slot 740 are formed along the axial length of piston 700. In some embodiments, piston 700 can be made of ceramic or other long-lasting materials such as carbon annealed steel.

GP block 230 can also include air passage 755, an air inlet 757, and an air outlet 757. Instead of air, a cleaning fluid such as alcohol can be used. Alternatively, a mixture of air and cleaning fluid can be used. The cleaning cycle that uses passage 755 will be discussed below with respect to FIGS. 7E-I.

FIG. 7D illustrates piston 700 in the purge position within GP block 230. When piston 700 is in the purge position, fluid passage 730 is open to inlet 745, which leads to the mixing chamber (not shown) of spray gun 205 via path 762. This makes the cleaning fluid in passage 730 available for the cleaning of spray gun 205. In the purge mode, pressurized air is forced through orifice 420 (see FIG. 4) and creates a vacuum that draws out the cleaning fluid from passage 730 (and/or a fluid accumulator) into the mixing chamber. In some embodiments, air can be forced through orifice 420 while cleaning fluid is simultaneously pumped through fluid passage 730 via inlet 710. This direct injection approach can be used to clean the spray gun and/or the mixing chamber for an extended period, if desired. In some embodiments, fluid passage 730 and air passage 725 can be located on the opposite sides of piston 700. Fluid port 710 can provide cleaning fluid by pressurizing the cleaning fluid into fluid passage 730. In some embodiments, fluid port 710 is coupled to an accumulator/reservoir (not shown), which provides a predetermined volume of cleaning fluid during the purging process.

In some embodiments, cleaning fluid port 710 can include a check valve (not shown) to keep the cleaning fluid from flowing back to the accumulator during the purging process. Meanwhile, pressurized air is forced into air passage 725 via air inlet 720. Positive air pressure at air inlet 720 continuously forces air into air passage 725 until an escape pathway 764 is established when piston 700 is in the purging position. The positive air pressure can push any remaining glaze solution in port 715 and intake pipe 240 (see FIG. 3A) back to container 215. It should be noted that after the glazing process, any glaze solution that is still inside of intake pipe 240 is undesirable because eventually the glaze materials (e.g., ceramic particles) will settle downward, which thereby leaves a non-homogenous mixture of glaze solution or a glaze solution with very little glaze materials. If intake pipe 240 is not purged out before the next glazing cycle, the next glazing cycle will have very little glazing materials in the glaze solution as the glaze materials in intake pipe 240 have settled back to container 215. By cleaning out intake pipe 240, a new and homogeneous glaze solution can be pushed through intake pipe 240 prior to each glazing cycle.

Figure 7E:
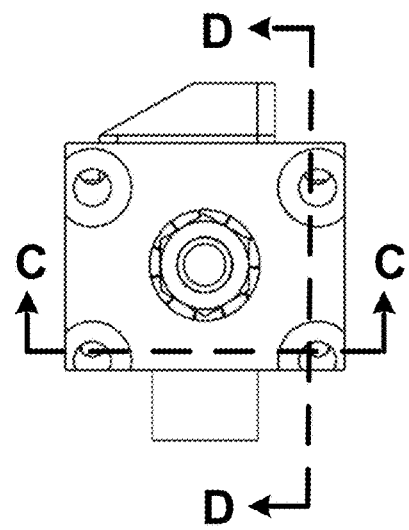
FIG. 7E is a side view of a GP block, shown in FIG. 7A, with sectional planes C and D.
Figure 7F:
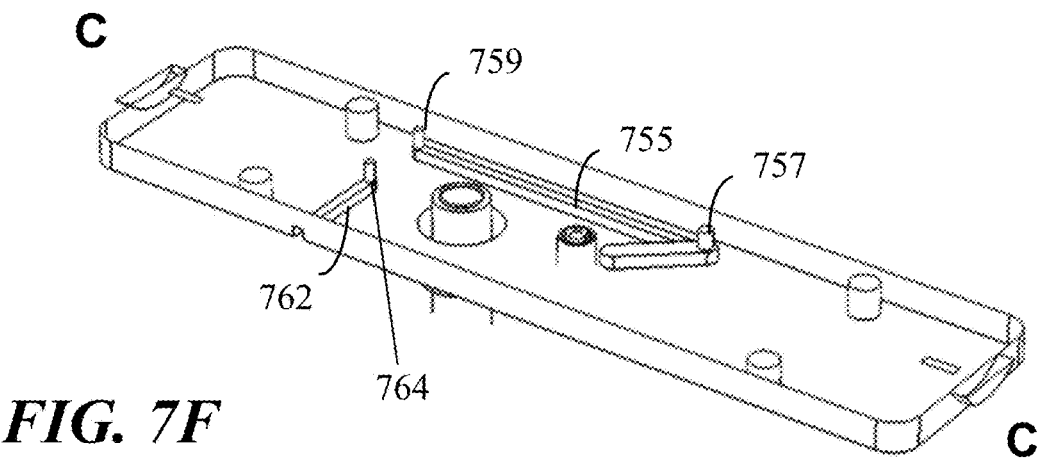
FIG. 7F is a sectional and perspective view of the GP block shown in FIG. 7E at sectional plane C.
Figure 7G:
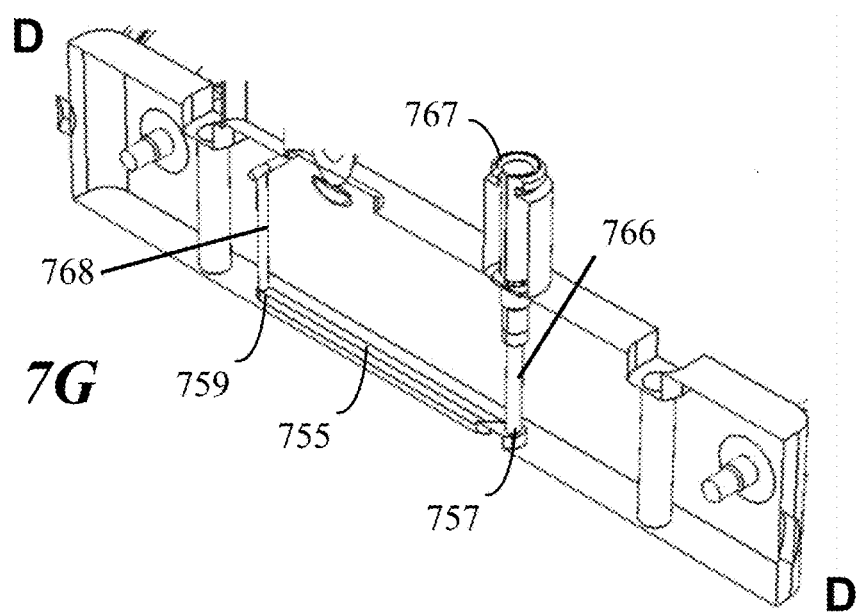
FIG. 7G is a sectional and perspective view of the GP block shown in FIG. 7E at sectional plane D.
Figure 7H:
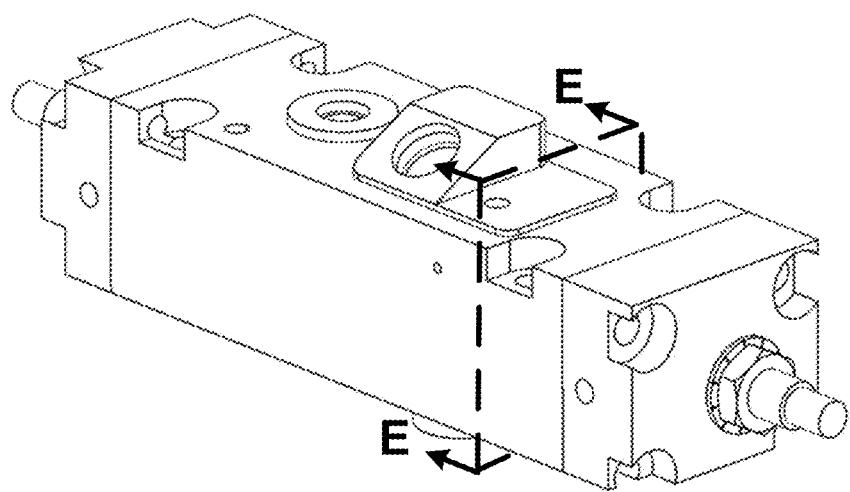
FIG. 7H is a perspective view of the GP block, shown in FIG. 7A, with sectional plane E.

FIG. 7E illustrates a side view of GP block 230 with sectional planes C and D. FIG. 7F illustrates a sectional view along sectional plane C. FIG. 7G illustrates a sectional view of GP block 230 along section plane D. FIG. H illustrates a perspective view of GP block 230 with sectional plane E. FIG. 1 illustrates a sectional view of GP block 230 along sectional plane E. FIGS. 7E-7I will be discussed concurrently to better explain the various channels and outlets within GP block 230. Referring to FIG. 7F, GP block 230 includes channel 755, inlet 757, inlet 759, passage 762, and outlet 764. Referring to FIG. 7G, inlet 757 is coupled to passage 766, which is coupled to a fluid or air source. In some embodiments, inlet 757 is coupled to a cleaning fluid source such as a source for an alcohol-based cleaning solution. Channel 755 can be sized appropriately to contain a predetermined amount of fluid. As shown, channel 755 can be L-shaped, but other shapes can be used to adjust the total volume of channel 755.

Figure 7I:
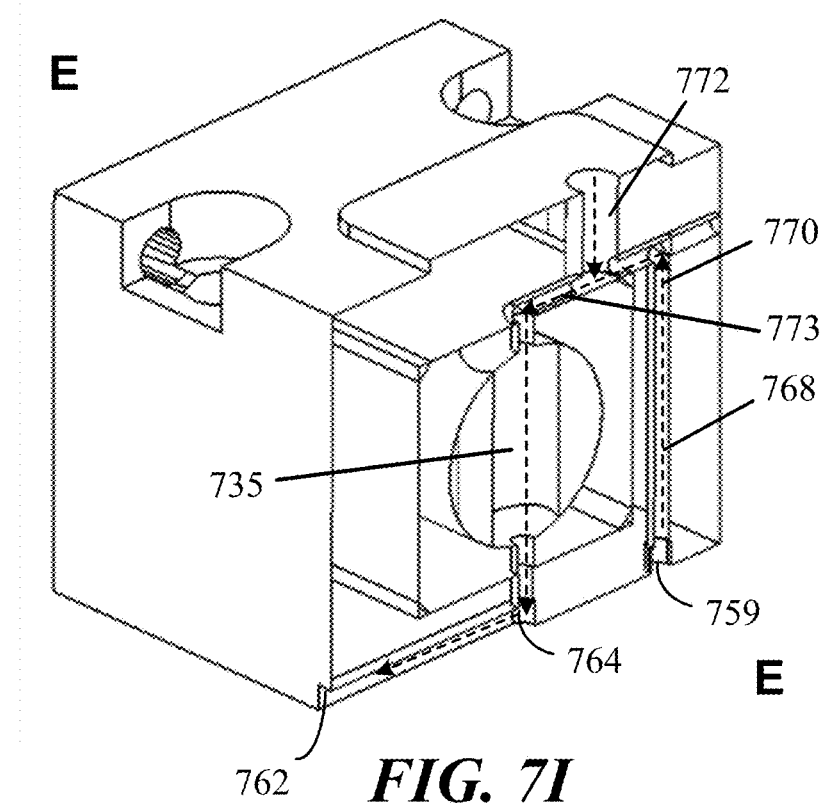
FIG. 7I is a sectional and perspective view of the GP block, shown in FIG. 7H, at sectional plane E.

As fluid is delivered to channel 755 via inlet 767, passage 766, and inlet 757, the fluid can travel to passage 768 via inlet 759. Referring now to FIG. 7I, in some embodiments, the fluid injected via inlet 759 can take path 770 to reach outlet 764 and passage 762. In this way, chamber 735 (which was the spray passage 735 when piston 700 is in the glaze position) can be purged of any residue within chamber 735. In some embodiments, prior to the purging process, some amount of cleaning fluid can be stored in a chamber (not shown) coupled to passage 772. Once air is forced through passage 773, the cleaning fluid is suctioned to chamber 735 via the Venturi effect. In this way, any glaze solution residue within chamber 735 can be purged.

Figure 8B:
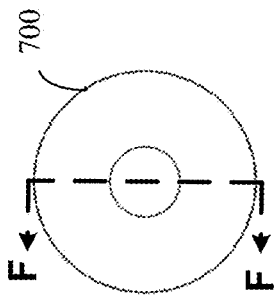
FIG. 8B is a side view of the piston, shown in FIG. 8A, with sectional plane F.
Figure 8A:
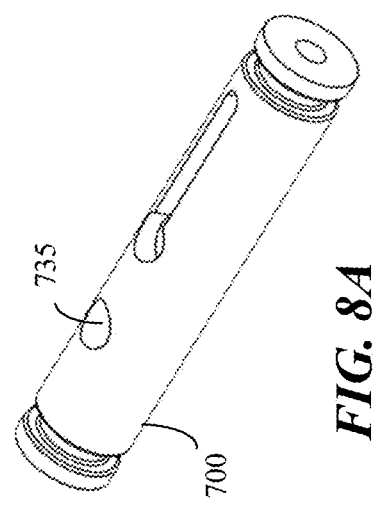
FIG. 8A is a perspective view of a piston of a GP block in accordance with some embodiments of the present disclosure.
Figure 8C:
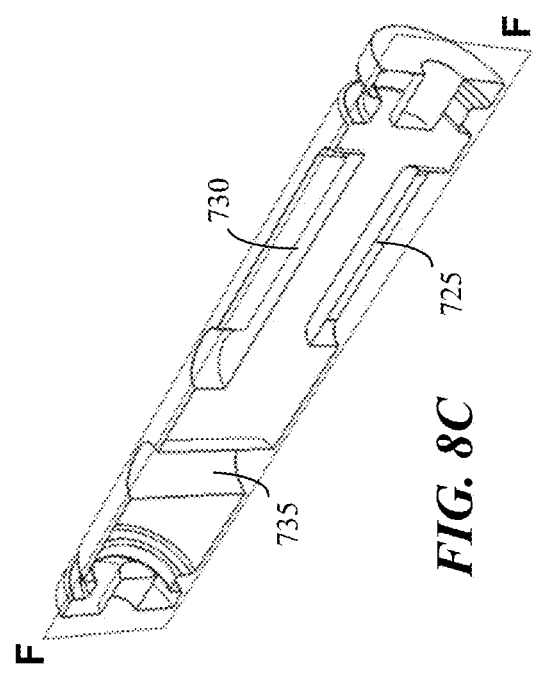
FIG. 8C is a sectional and perspective view of the piston, shown in FIG. 8A, at sectional plane F.

FIG. 8A is a perspective view of piston 700 in accordance with some embodiments of the present disclosure. FIG. 8B is a side view of piston 700 with sectional plane F. FIG. 8C is a sectional view of piston 700 along sectional plane F. In some embodiments, piston 700 is made of ceramic, which can be milled to a very precise and tight tolerance. In this way, piston 700 is well fitted to the lumen (not shown) of GP block 230 and thereby prevent any fluid leakage between the walls of piston 700 and the lumen of GP block 230.

Figure 9A:
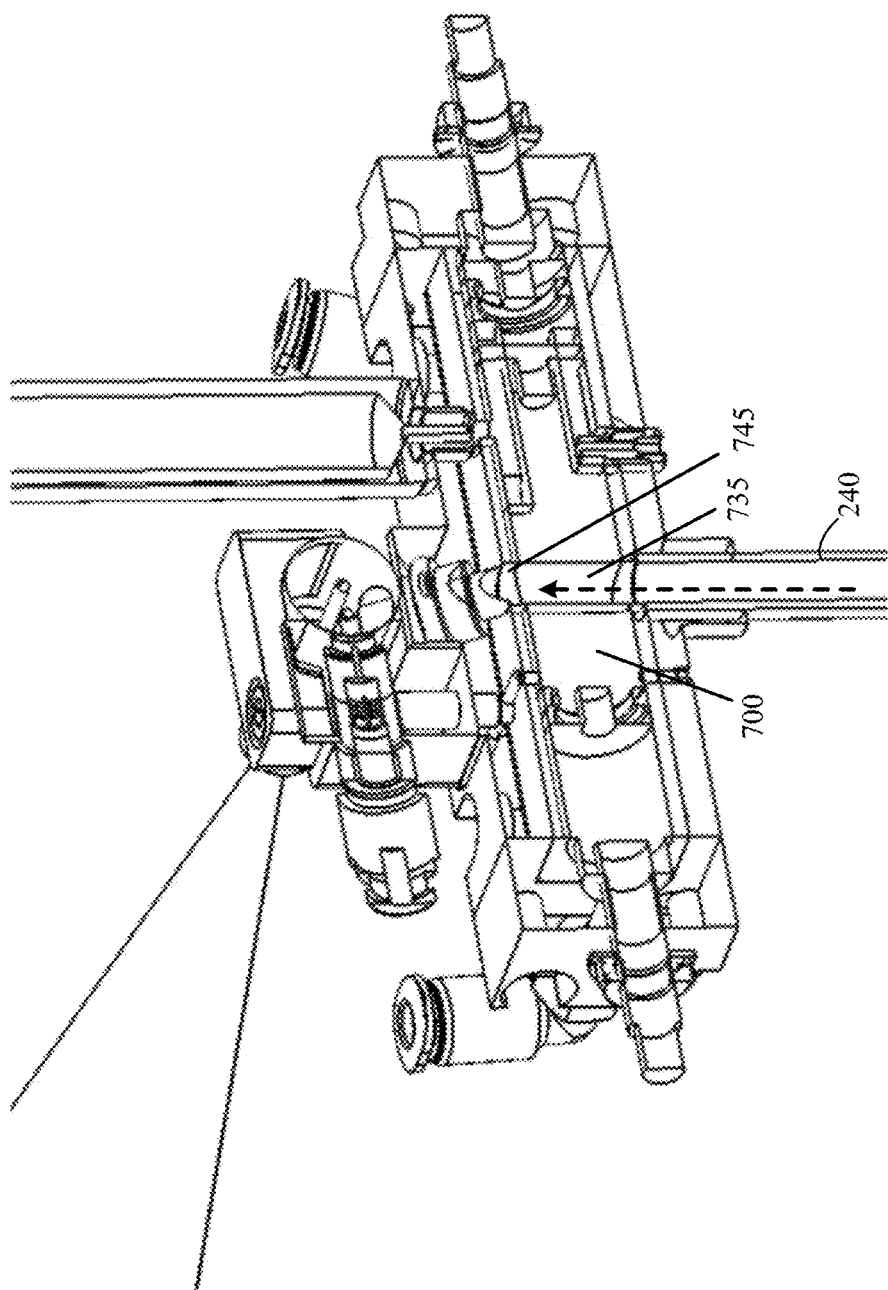
FIG. 9A is a sectional and perspective view of a spray gun and GP block assembly in the spray position in accordance with some embodiments of the present disclosure.

FIG. 9A illustrates a sectional view of GP block 230 with piston 700 in the glazing position in accordance with some embodiments of the present disclosure. As shown, spray passage 735 (or chamber 735) is aligned with inlet 745, which leads to the mixing chamber of spray gun 205. This allows the glaze solution to travel from container 215 (see FIG. 2A) to spray passage 735 via intake pipe 240.

Figure 9B:
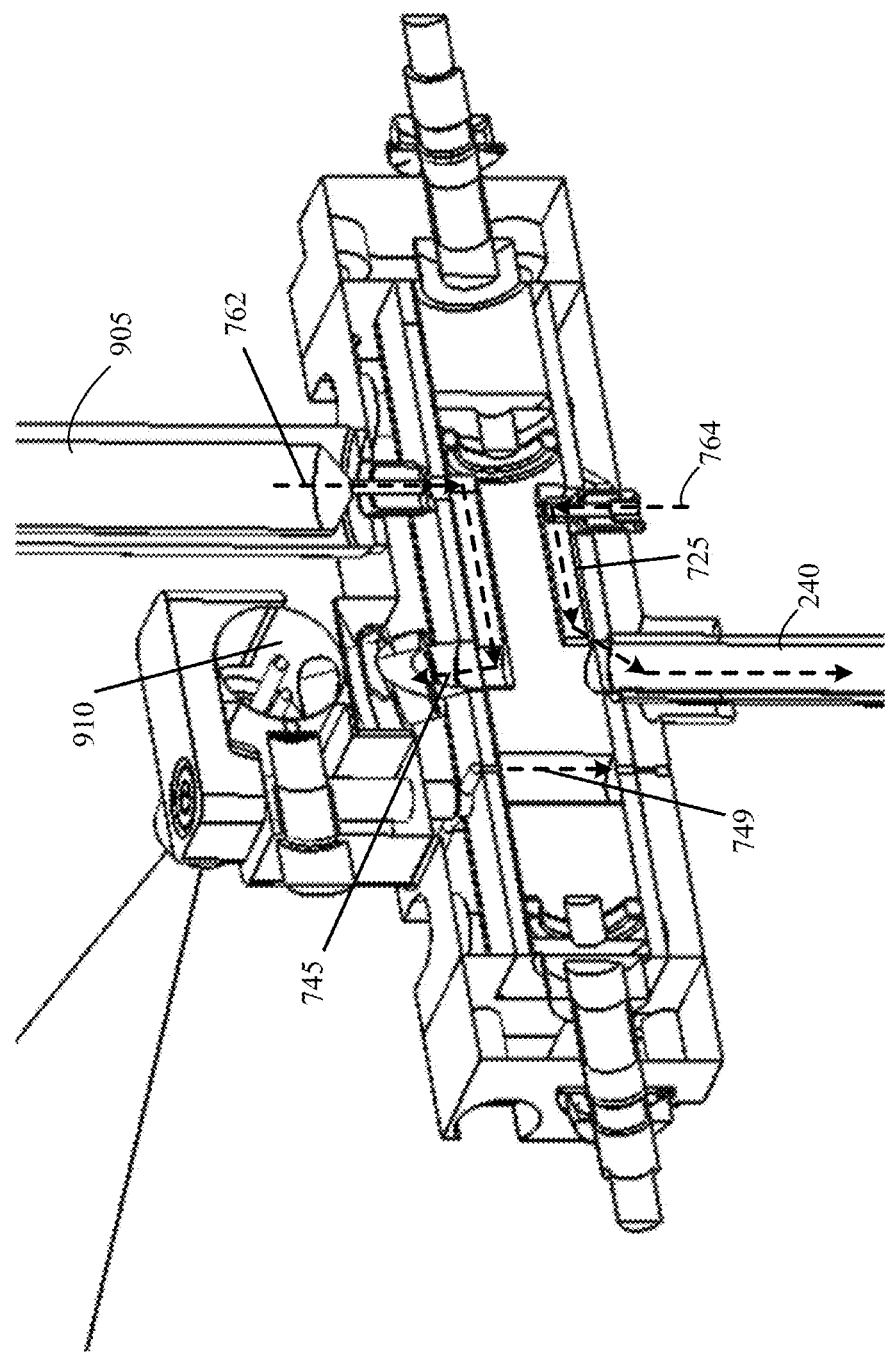
FIG. 9B is a sectional and perspective view of a spray gun and GP block assembly in the purge position in accordance with some embodiments of the present disclosure.

FIG. 9B illustrates a sectional view of GP block 230 with piston 700 in the purging position in accordance with some embodiments of the present disclosure. During the purging stage, three areas of spray gun 205 and GP block 230 can be purged. These three areas can be purged simultaneously or in sequence. The first area that can be purged is the mixing chamber and other internal components of spray gun 205, which are purged by a cleaning fluid from fluid accumulator 905. Once piston 700 is actuated to the purge position, the pressurized cleaning fluid travels to passage 730 and to inlet 745 as illustrated by path 762. Inlet 745 is fluidically coupled to mixing chamber 910 of spray gun 205. When piston 700 is in the second position, fluid passage 730 is moved causing a portion of fluid passage 730 to be opened (fluidically coupled) to inlet 745. This allows the pressurized cleaning fluid accumulated in reservoir 905 to travel from reservoir 905 to spray gun 205. In this way, any glaze solution residue in spray gun 205 is forced out once the cleaning fluid is allowed to travel through inlet 745 and out of the exit nozzle of spray gun 205. The cleaning fluid may be pressurized air or may be a liquid such as alcohol or other suitable cleaning fluid.

The second area that can be purged is intake pipe 240, which can be purged by pressurized air traveling via path 764. The pressurized air pushes any remaining glaze solution in the intake pipe 240 back to container 215 (see FIG. 2A). The third area that can be purged is chamber 735, which may contain some residue of the glaze solution from a previous glazing cycle. Pressurized air or cleaning fluid can be forced through chamber 735 via path 749. As the pressurized air or cleaning fluid exits chamber 735, any residue within chamber 735 is forced out. Stated differently, when piston 700 moves from the first to the second position, air passage 725 is shifted and a pathway between air passage 725 and intake pipe 240 is established. Positive air pressure from air passage 725 forces pressurized air down intake pipe 240 and to glaze solution container 215. This forces any remaining glaze solution, from the previous spray, in intake pipe 240 back into glaze solution container 215. This clears intake pipe 240 and ensures that when the next spray cycle starts, a homogeneous glaze solution is drawn from glaze solution container 215. This step is advantageous because the glaze materials (e.g., ceramic particles) in the leftover glaze solution within intake pipe 240 will settle back to glaze solution container 215 leaving the leftover solution with very little to zero concentration of ceramic particles.

In some embodiments, spray gun 205 can be cleaned after each dental prosthesis is glazed or after a certain number of dental prostheses are glazed. Alternatively, the cleaning cycle can be performed when there is a change in the operator or during a shift change. In some embodiments, the cleaning cycle is performed for each different lot of dental prostheses.

In some embodiments, the purging process of each spray gun can include the following stages: shift GP block 230 to the purge position; pump cleaning fluid into fluid passage 730 (see FIG. 7D); force air through passage 725; shut off fluid valve at fluid port 710; activate purge air on spray gun; activate spray air on spray gun; delay for a time period (e.g., 0.5 to 5 seconds); activate purge air on spray gun for a second time; activate spray and air on spray gun for a second time; delay for another time period; activate purge and spray air on spray gun for a third time; delay for another time period; activate purge and spray air on spray gun for a fourth time; and shift GP block 230 to glaze position. It should be noted that the purge and spray air cycles with intermittent delays can be shorten to two cycles or lengthen to five or more cycles.

Figure 10:
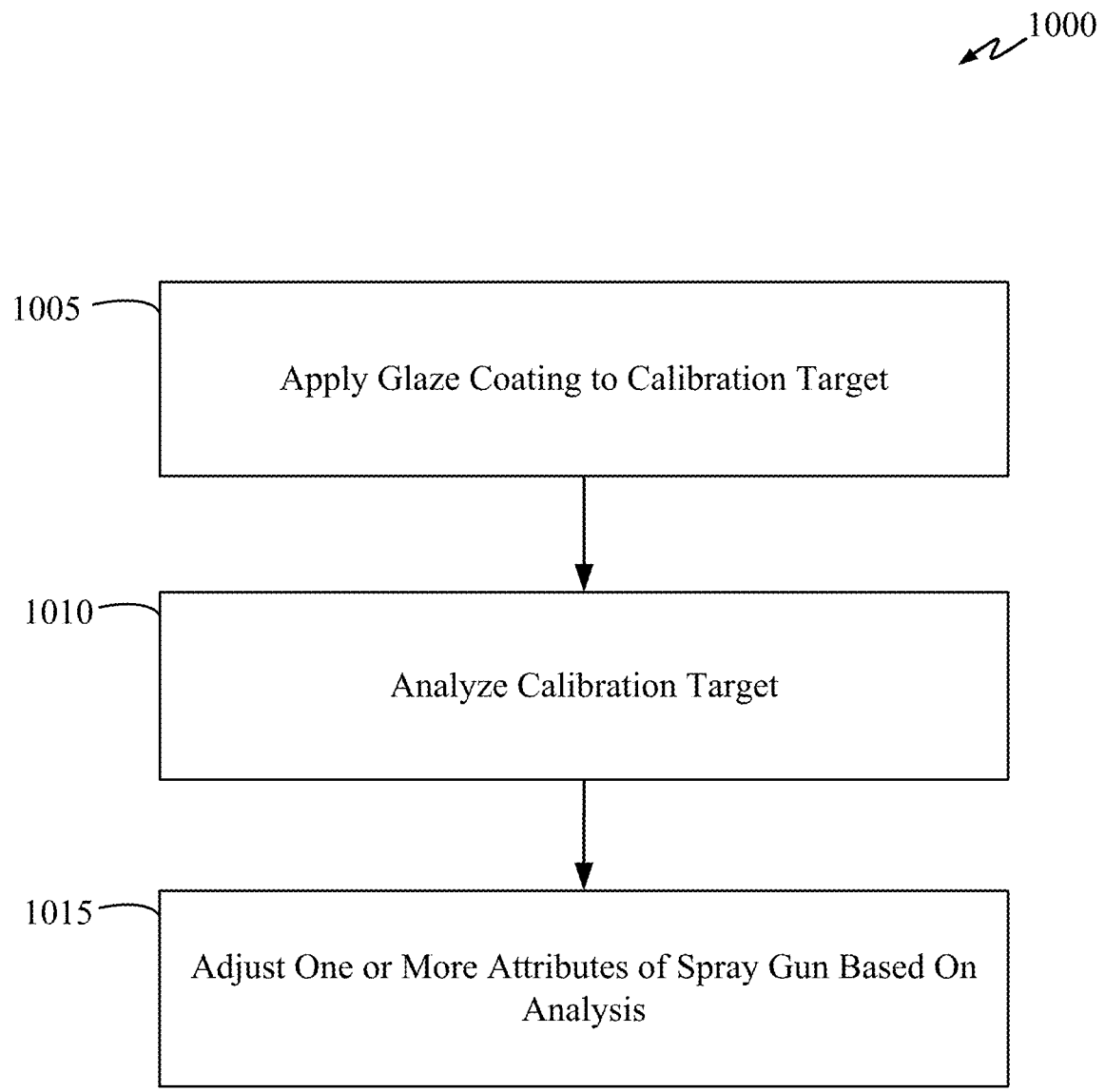
FIG. 10 is a flow diagram of an automated calibration process in accordance with some embodiments of the present disclosure.

FIG. 10 illustrates a calibration process 1000 in accordance with some embodiments of the present disclosure. Calibration process 1000 starts at 1005 where a glaze coating is applied to a calibration target. The calibration target (not shown) can be a colored (e.g., black) target with visual indicator to show the distribution of a calibration spray. The calibration target can also a pre-weighted so that the calibration target can be weighted after a calibration spray has been performed. The calibration target can be replaced with a new calibration target after each calibration cycle. The calibration target can be placed onto or near gripper 220. In some embodiments, the calibration target can be directly or indirectly held by gripper 220.

At 1010, the glaze-applied calibration target is analyzed for glaze distribution, total weight, etc. The glaze distribution on the calibration target can be analyzed by a vision system (not shown) or can be done manually. The total weight of the glaze-applied calibration target can be weighted manually or automatically by an integrated scale. In some embodiments, the spray pattern of one of the spray guns (e.g., spray gun 205, 210) is analyzed with respect to the center of the calibration target. This quantify the amount of offset the spray pattern with respect to the center of the calibration target.

At 1015, one or more attributes of spray gun 205 can be adjusted based on the analysis of the glaze-applied calibration target. For example, the position (e.g., x-y-z coordinates) of spray gun 205 can be adjusted so that spray gun 205 or 210 is properly positioned such that the spray distribution is at or near the intended target location. In another example, the spray velocity can be modified to adjust the total amount of glaze solution being applied based on the weight of the glaze-applied calibration target. In some embodiments, the nozzle vibrational frequency and amplitude can also be modified based on the analysis of the calibration target. For instance, based on the weight analysis of the glaze-sprayed calibration target, the output frequency and/or amplitude of a piezoelectric transducer of an ultrasonic spray gun can be increased or decreased to modify the volume of glaze materials being ejected from the ultrasonic spray gun nozzle.

Figure 11A:
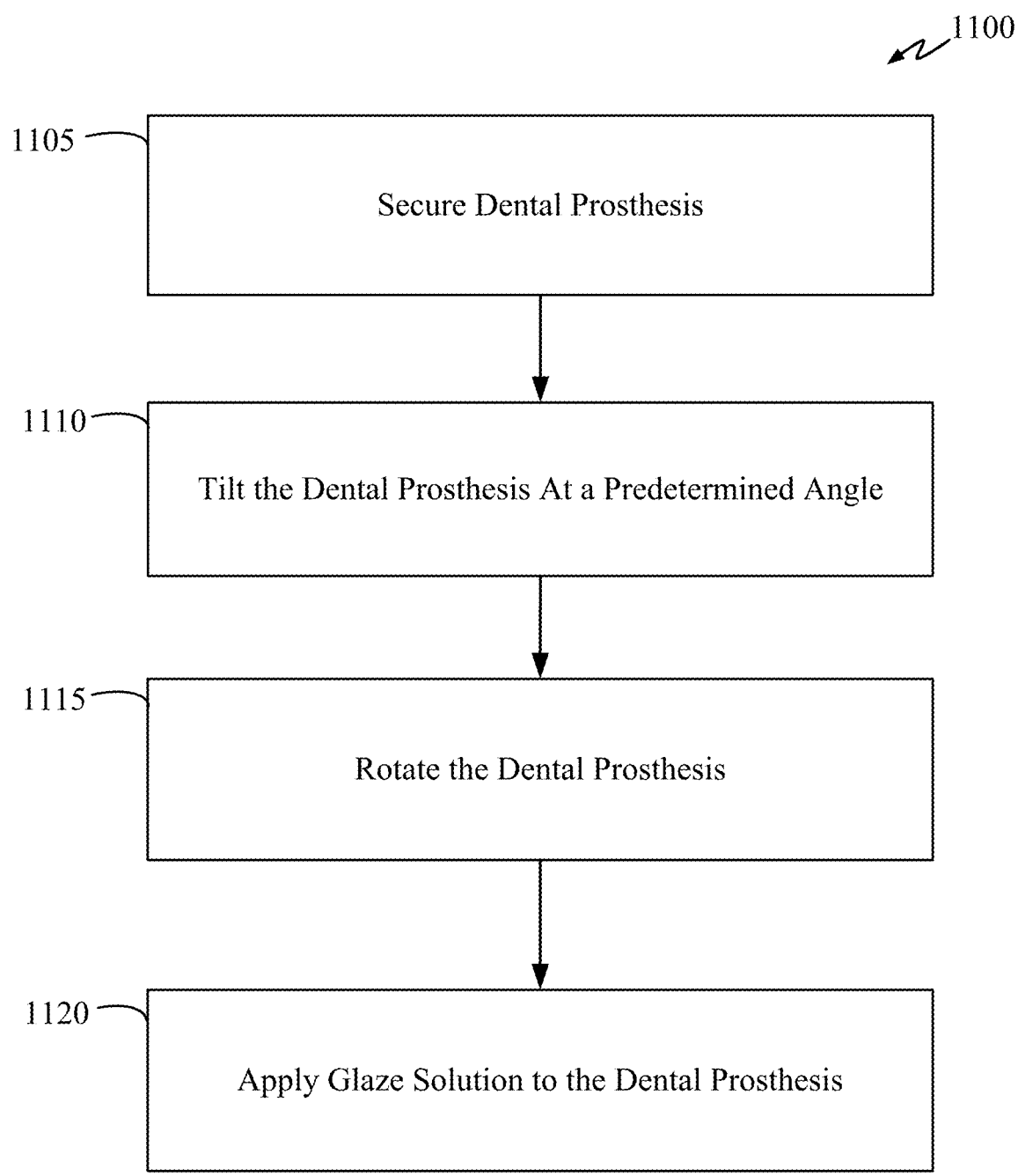
FIG. 11A is a flow diagram of an automated process for applying spray glaze to a dental prosthesis in accordance with some embodiments of the present disclosure.

FIG. 11A illustrates an auto-glazing process 1100 in accordance with some embodiments of the present disclosure. Process 1100 starts at 1105 where a dental prosthesis is securely placed into a holder (e.g., gripper 220), which can be mounted on a moveable platform (e.g., platform 225). At 1110, pivotable platform 225 is pivoted at a predetermined angle. In some embodiments, the tilt angle is 45°. Once platform 225 is pivoted, it places the dental prosthesis into position and in the direct line of sight of both of the spray guns. At 1115, gripper 220 can be rotated at a predetermine rate of rotation (e.g., RPM). In some embodiments, gripper 220 can be rotated at 15 RPM during the glazing process. Gripper 220 can also vary the rate of rotation at any point of the glazing process. At 1120, the glaze solution is sprayed onto the dental prosthesis. Processes 1115 and 1120 can occur concurrently or can be treated as a single process.

In some embodiments, the glazing process at 1115 and 1120 is as follows: gripper 220 is rotating at 15 RPM; spray gun 205 is tuned on to spray the glaze solution for half of a revolution of the dental prosthesis and then turn off; second spray gun 210 is then turned on to spray the glaze solution for the next two revolutions of the dental prosthesis, then second spray gun 210 is turned off; spray gun 205 is then turned on for a second time for another half of a revolution of the dental prosthesis, and then is turned off. Multiple spraying stages are used at 1115 and 1120 to allow the alcohol in the glaze solution sufficient time to evaporate. If there is no rest time between the two different sprays of the spray gun 205, the alcohol will accumulate on the crown occlusal surface. As a result, the glaze materials (e.g., ceramic particles) can sink to the bottom and form a thick layer of glaze at the bottom of the dental prosthesis instead of covering the entire occlusal surface evenly. Accordingly, breaking the occlusal spray in two or more steps allows the occlusal surface of the dental prosthesis to dry up a bit before the next spray is applied.

It should be noted that other spraying sequence or profile can also be used. For example, the order of the sprays can be reversed (e.g., spraying the second spray gun 210 first). The number of revolutions of the dental prosthesis during each spraying step can also be changed. The gripper rate of rotation can also be changed or varied during the glazing process. In some embodiments, one or more of the spray guns can be moved along a predetermined trajectory during the glaze application process while the dental prosthesis stay stationary or being rotated by gripper 220. Spray gun 205 can be turned on at two or more stages, each stage with varying or the same spray time. One of the reasons for employing multiple spraying stages for spray gun 205 is because the alcohol in the glaze solution does not evaporate fast enough. Thus, if there is no rest time between sprays, the alcohol will accumulate on the crown occlusal surface. When this happens, the glaze particles tent to sink to the bottom create a thick layer of glaze instead of covering on the entire occlusal surface evenly. Accordingly, breaking the occlusal spray in two or more steps allows the occlusal surface of the dental prosthesis to dry up a bit before the final spray. As for the body of the dental prosthesis, it takes approximately 4000 microseconds for each area to evaporate before it is sprayed again. In this way, the alcohol in the glaze solution mixture on the surface is allowed sufficient time to evaporate before the second layer is sprayed.

Figure 11B:
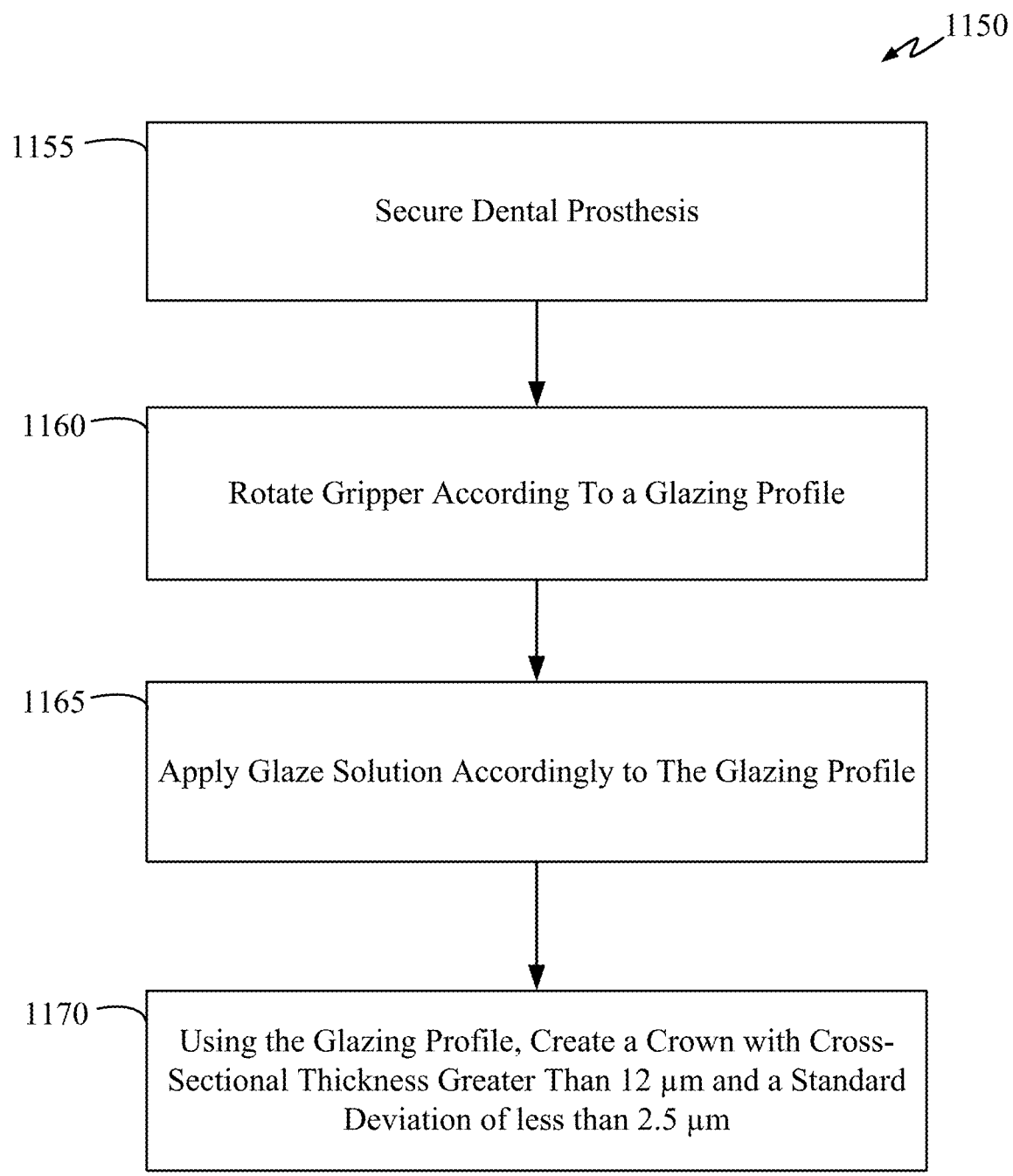
FIG. 11B is a flow diagram of an automated process for applying spray glaze to a dental prosthesis using a glazing profile in accordance with some embodiments of the present disclosure.

FIG. 11B illustrates an auto-glazing process 1150 that controls various components of system 200 based on a glazing profile in accordance with some embodiments of the present disclosure. Process 1150 starts at 1155 where a dental prosthesis is secured on a gripper. At 1160, the gripper is rotated using a glazing profile associated with the type of the dental prosthesis being secured on the gripper. The glazing profile can be based at least in part on the type of dental prosthesis. For example, a molar with full anatomy can be associated with a glazing profile A, and a pre-molar can be associated with a glazing profile D. At 1165, the glaze solution is applied to the dental prosthesis according to the glazing profile associated with the type of dental prosthesis, which can be detected using a vision system and/or can be manually specified by a user. At 1170, a glazed-crown is created using the glazing profile selected for the detected type of dental prosthesis such that the glazed-crown has a cross-sectional average thickness greater than 12 µm and a thickness standard deviation of less than 2.5 µm.

Figure 12:
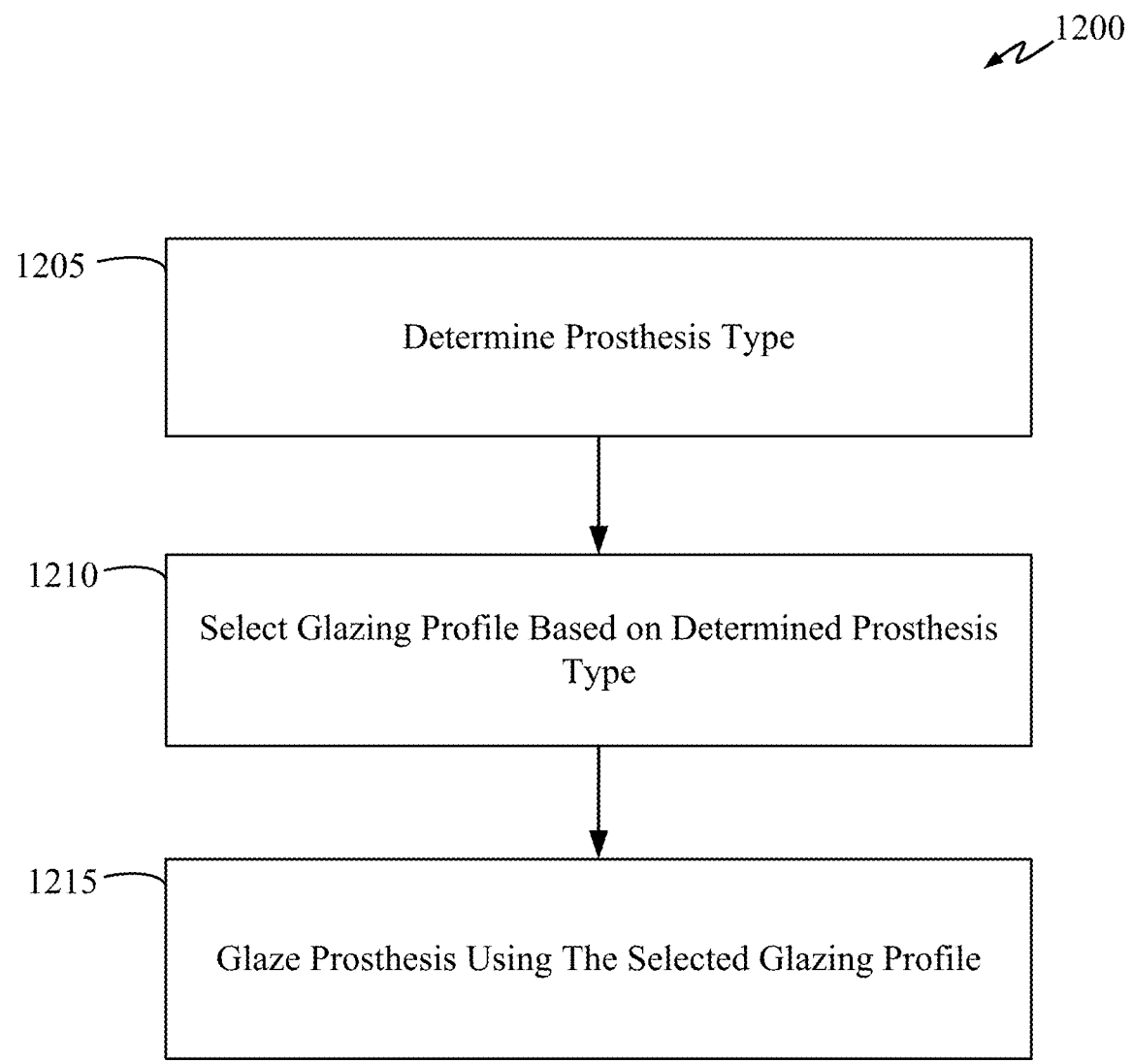
FIG. 12 is a flow diagram of a glazing process in accordance with some embodiments of the present disclosure.

FIG. 12 illustrates an auto-glazing process 1200 in accordance with some embodiments of the present disclosure. Process 1200 stars at 1205 after the dental prosthesis is mounted to gripper 220 where the prosthesis type is determined using a vision system (e.g., object recognition) and/or using manual data input. For example, after a dental prosthesis is placed onto gripper 220, a vision system (not shown) can analyze one or more picture(s) (having one or more angles) of the dental prosthesis and determine the type of dental prosthesis (pre-molar, molar with full anatomy, anterior, etc.) using a machine learning model (e.g., algorithm) that is pre-trained to identify dental prosthesis. The machine learning model can be a convolutional neural network, a recurrent neural network, a generative adversarial network, or other types of neural network.

At 1210, a glazing profile is selected based at least in part on the determined type of dental prosthesis. A glazing profile is a programmed sequence of actions of various components of system 200. The various components include, but not limited to, spray guns 205 and 210, gripper 220, mixing blade 235, platform 225, and GP block 230, etc. For example, a glazing profile can include a rotation profile that controls the rate of rotation and/or the duration of rotation of gripper 220; a platform profile that controls the angle of platform 225; a mixer profile that controls the rate of rotation of mixing blade 235; a spray profile that controls the spray time of spray gun 205 and/or spray gun 210, the spray velocity, and the spray gun travel trajectory before and during the glaze application process; and a purge profile that controls the purging cycle, etc.

Referring to FIG. 13 is a glazing profile table 1300 illustrating examples glazing profile for various crown types in accordance with some embodiments of the present disclosure. As shown, glazing profile 1310 is for a molar with full anatomy, glazing profile 1315 is for a molar with flat anatomy, glazing profile 1320 is for a pre-molar, and glazing profile 1325 is for an anterior molar. Although glazing profile table 1300 only shows four glazing profiles, it can include many other glazing profiles for various types of prosthesis. Referring to stage 1210, once the type of dental prosthesis is determined, the appropriate glazing profile can be selected. In some embodiments, the appropriate glazing profile can be selected based on glazing profile table 1300. For example, if the dental prosthesis is a pre-molar, then glazing profile 1320 can be selected, which dictates that gripper's 220 rate of rotation is to be 27.3 RPM. Next, the pre-molar is to be glazed by spray gun 205 for 1 revolution of gripper 220, and by spray gun 210 for 3 revolutions. Finally, the pre-molar is to be glazed by spray gun 205 again for 0.75 revolution.

Empirical Data

Figure 14A:
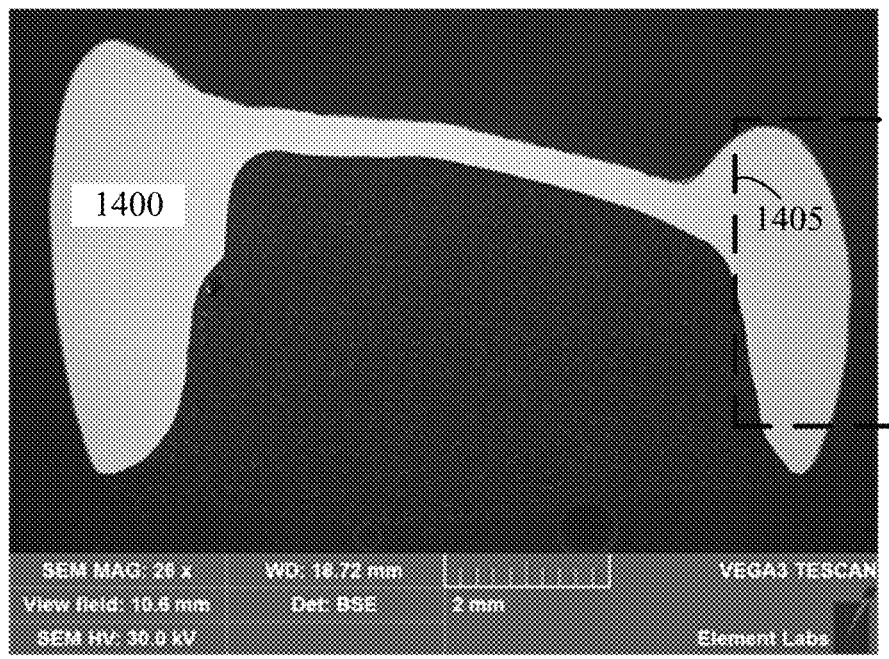
FIGS. 14A-M are SEM (scanning electron microscopy) images of crowns glazed by one or more automated glazing processes as disclosed in accordance with some embodiments of the present disclosure.

FIGS. 14A-M are SEM (scanning electron microscope) cross sectional images of crowns glazed by auto glazing system 200, which can implement process 1100, 1150, or 1200, in accordance with some embodiments of the present disclosure. FIG. 14A is a cross sectional SEM image of crown 1400. The crown samples from which SEM cross sectional images are created are prepared by first encapsulating a crown in a clear acrylic or epoxy resin. This can be accomplished by placing the crown in a container in an upside-down position. Next, a clear acrylic resin is poured into the container until the crown is completely submerged. Once the acrylic resin is cured, the acrylic-encapsulated crown is sectioned into half from the mesial side to the distal side of the crown to create the crown cross-section. Then, the crown cross-section is polished to remove all rough surfaces, debris, and scratches as a result of the sectioning procedure. Once the crown cross-section is polished, it is ready to be scanned by a SEM. In the examples shown and described herein, the SEM cross sectional images are generated using a VEGA3 SEM, which is manufactured by TESCAN.

Figure 14B:
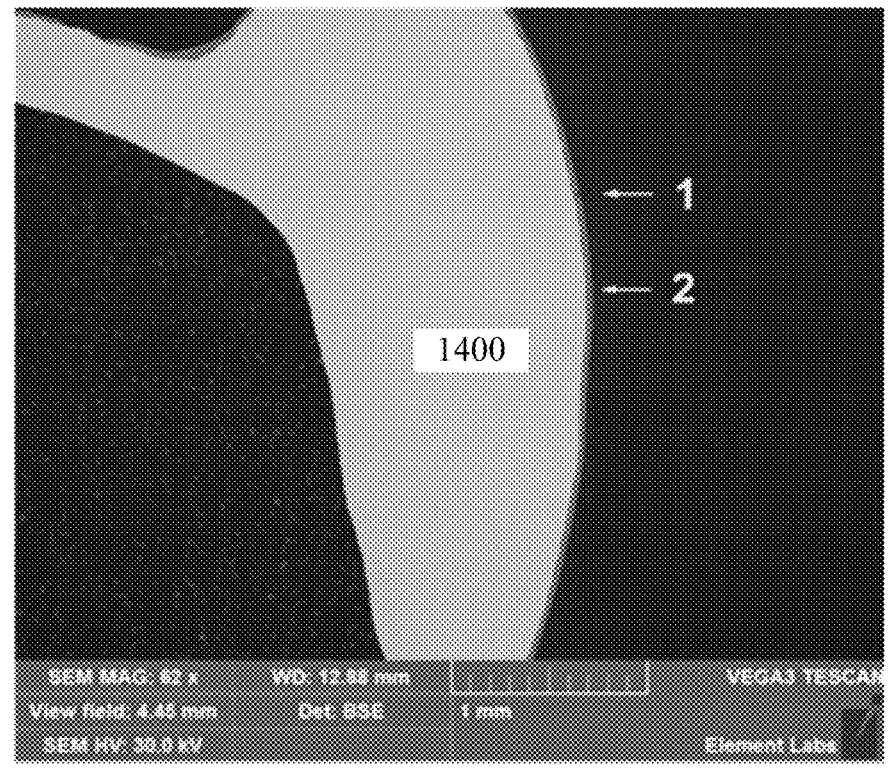
Figure 14C:
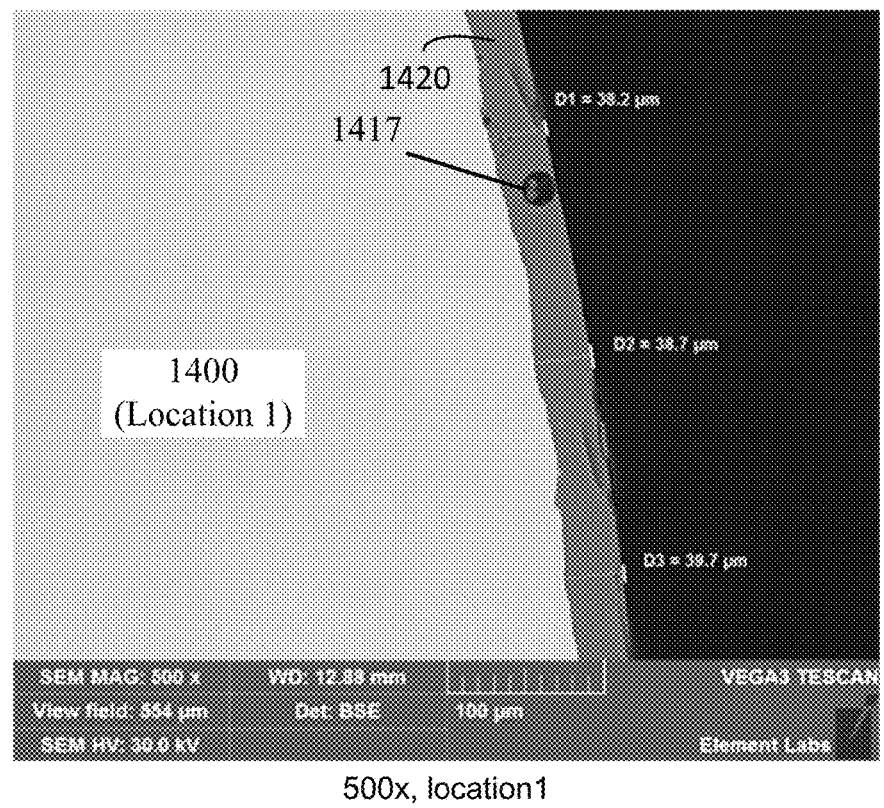
Figure 14D:
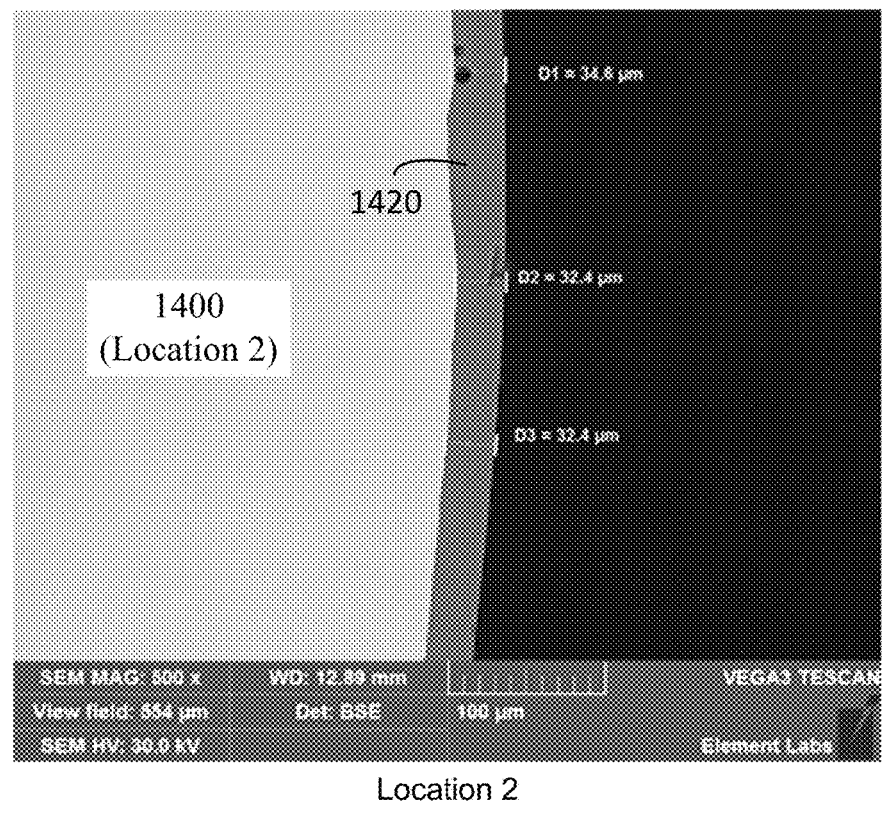
Figure 14E:
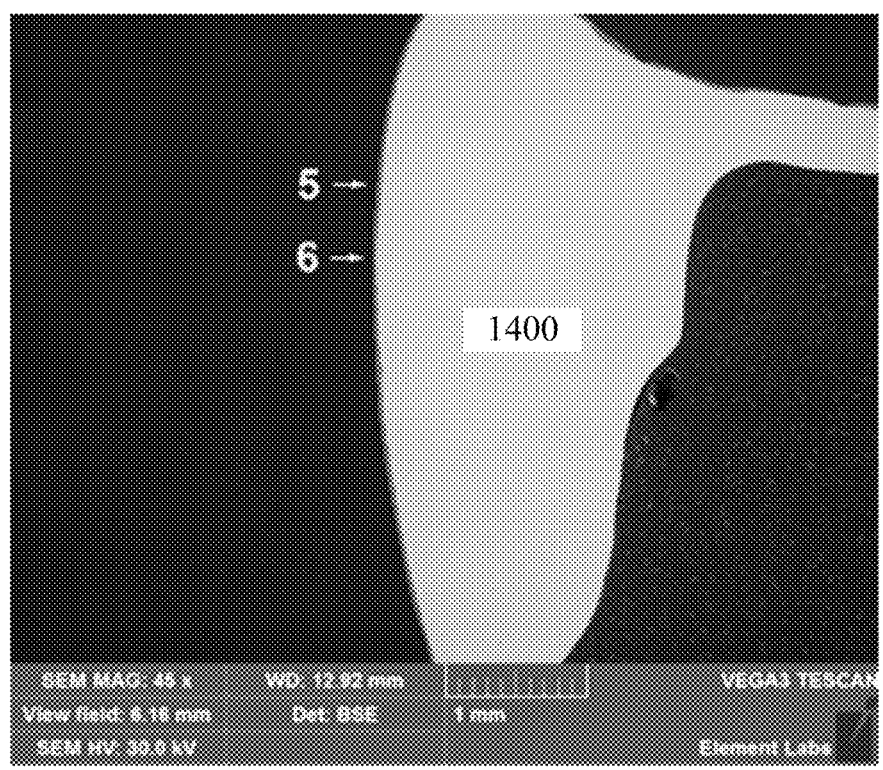
Figure 14F:
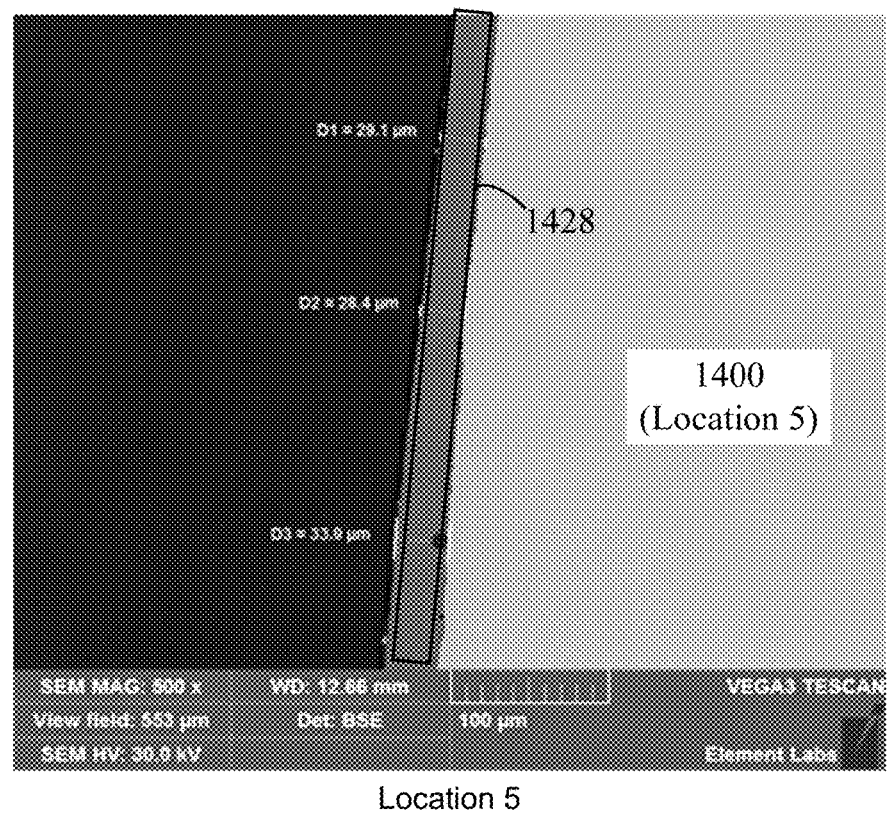
Figure 14G:
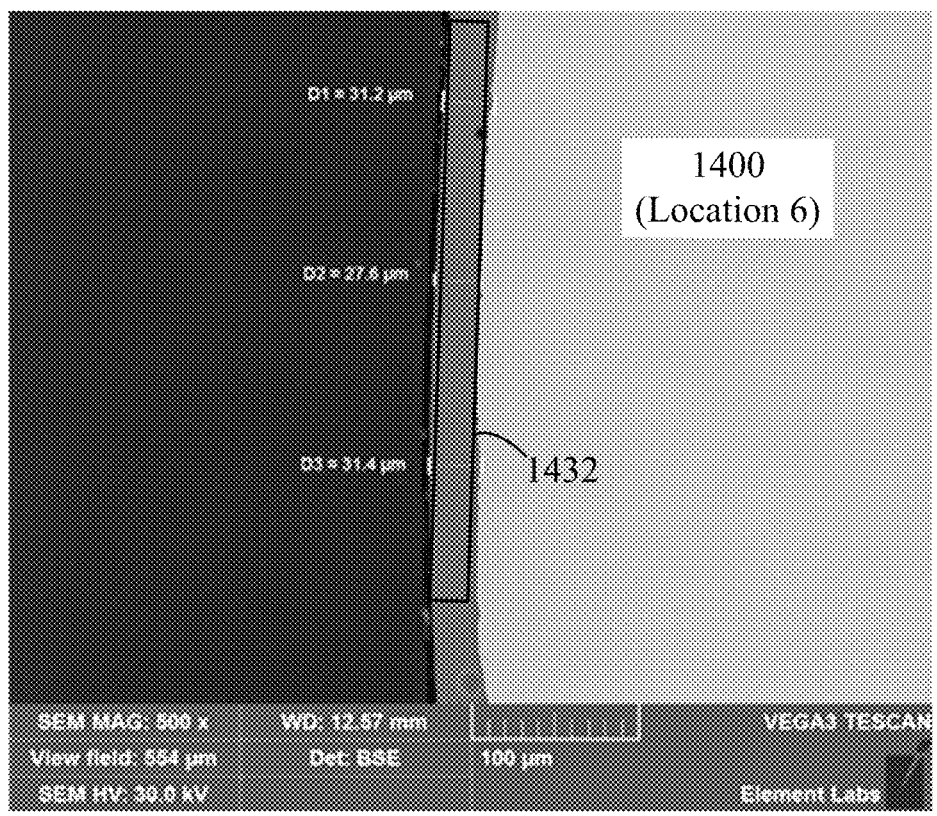
Figure 14H:
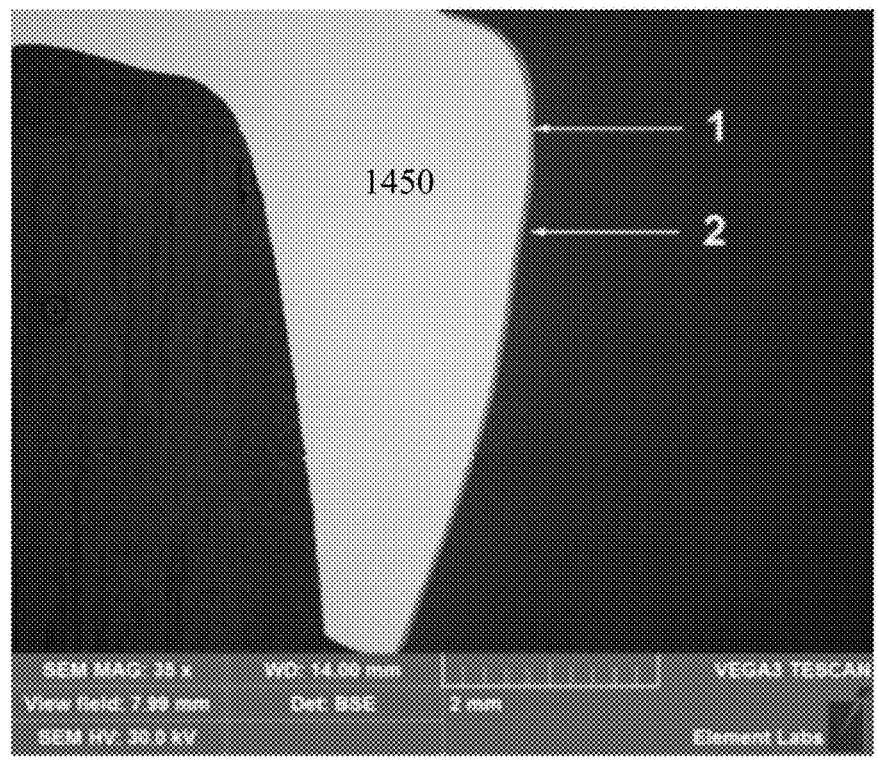
Figure 14I:
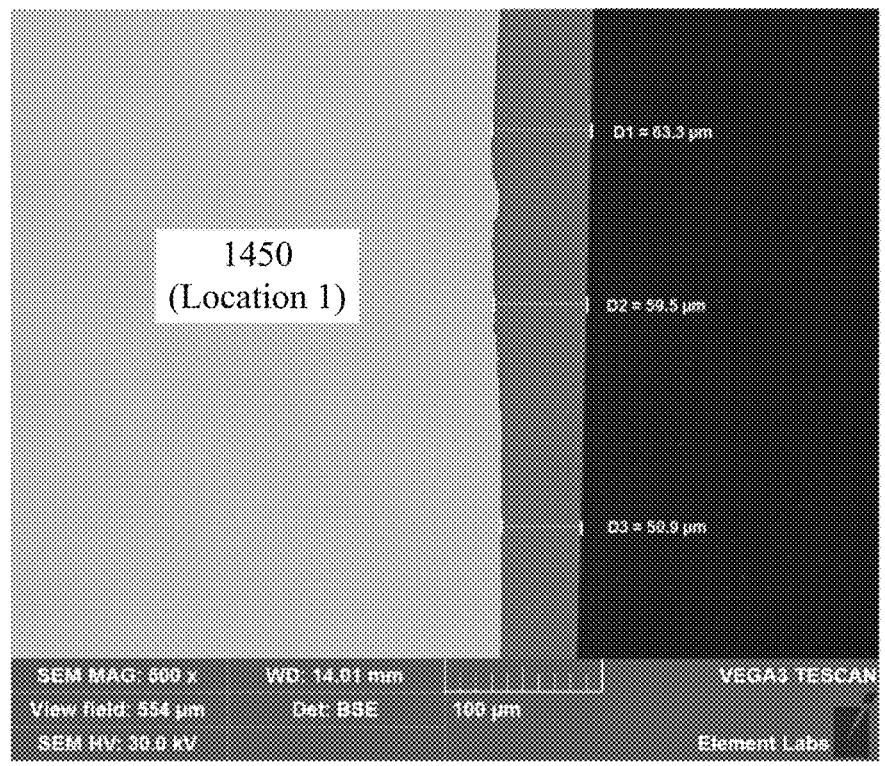
Figure 14J:
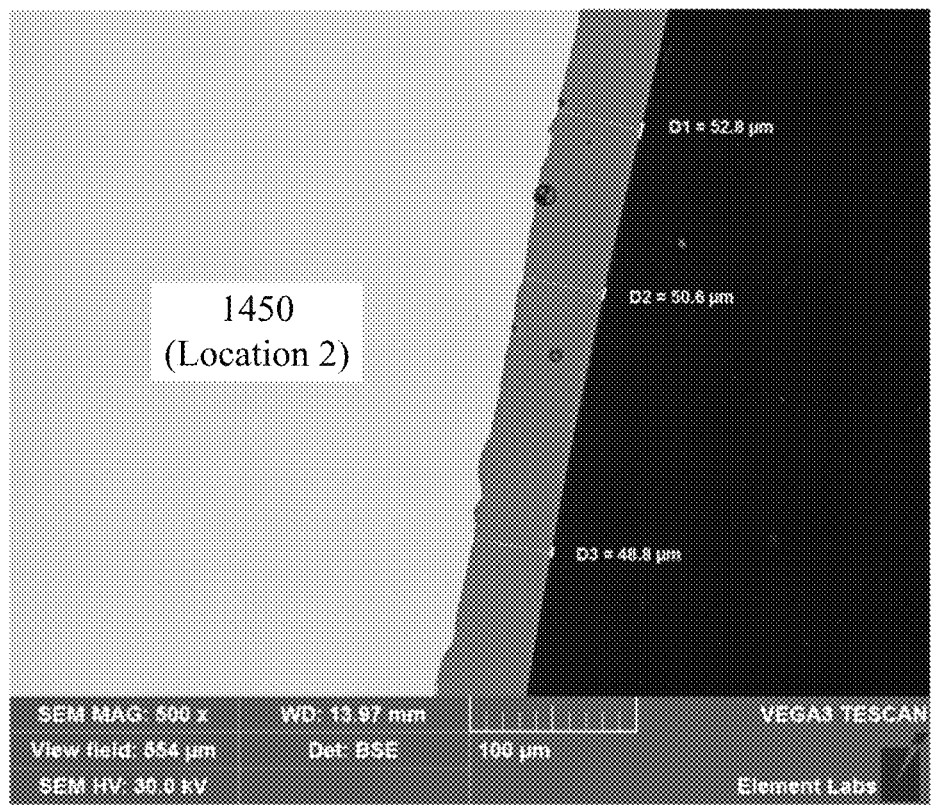
Figure 14K:
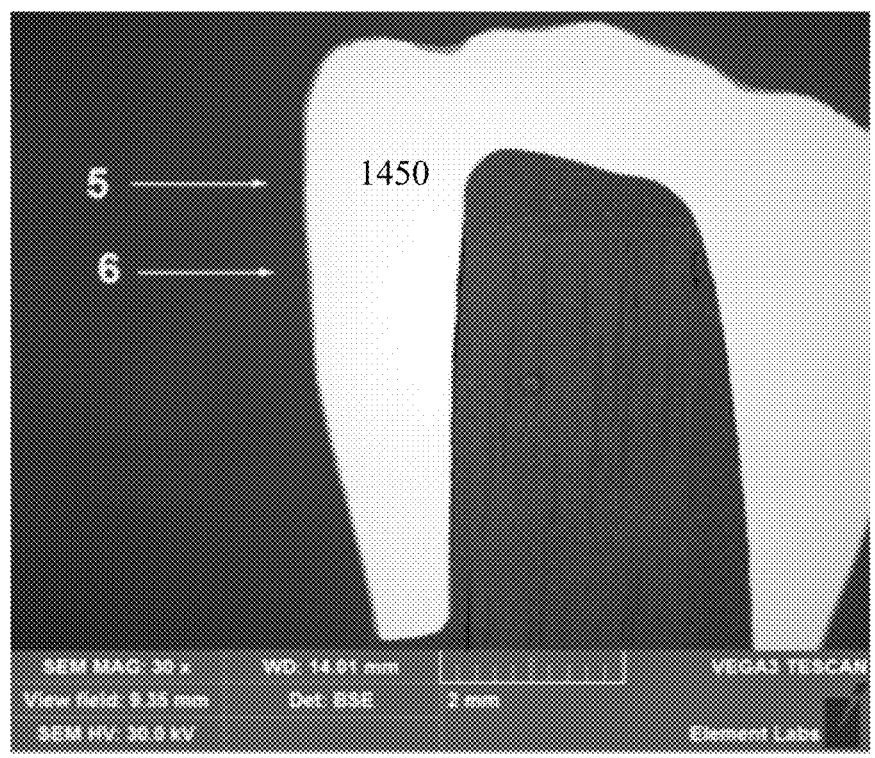
Figure 14L:
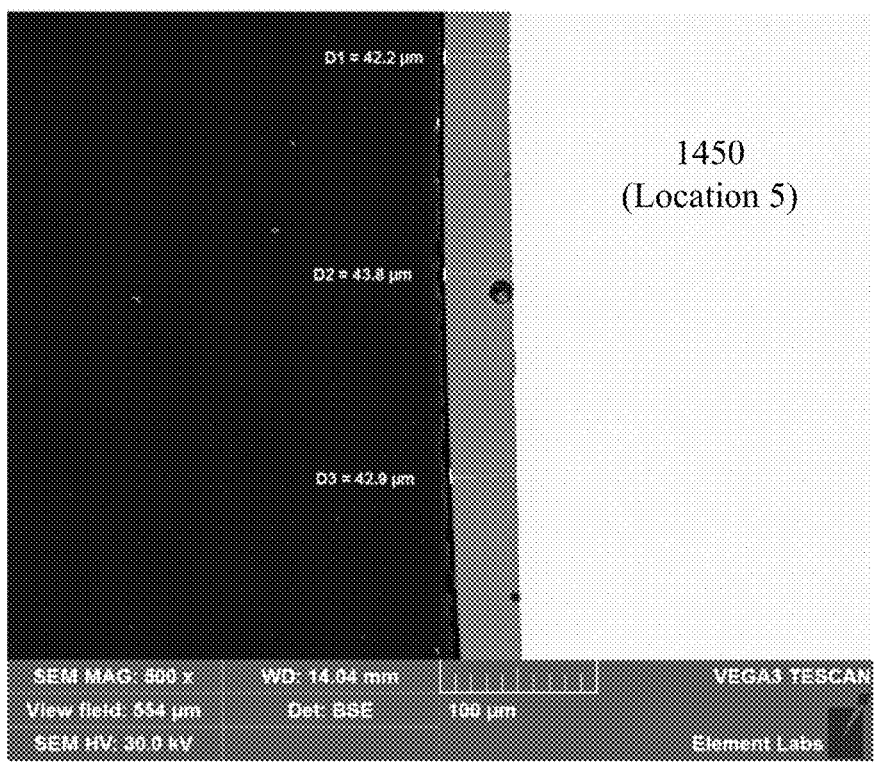
Figure 14M:
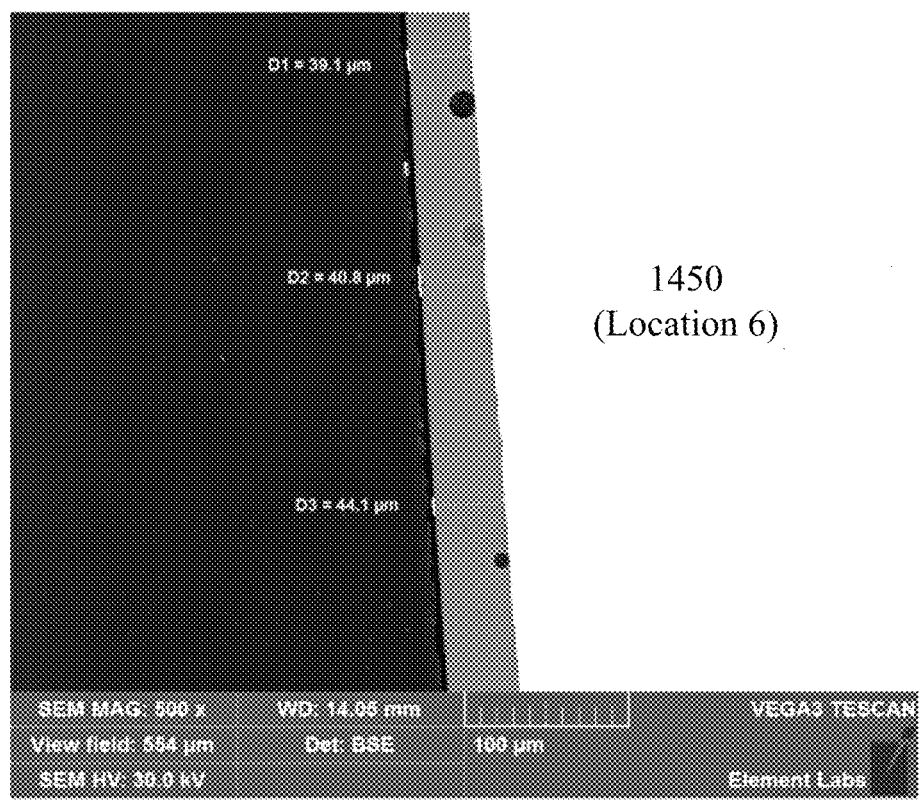
Figure 14N:
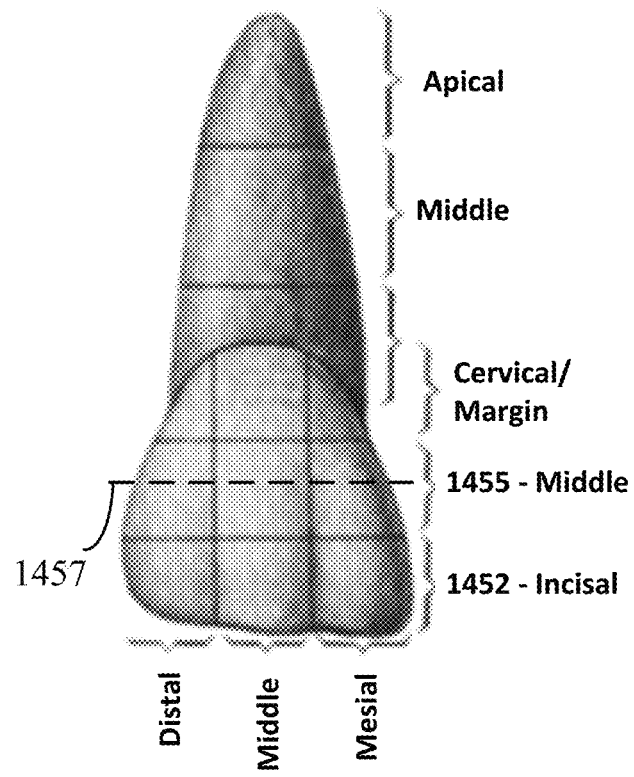
FIGS. 14N-O illustrate crowns being divided into various regions.
Figure 14O:
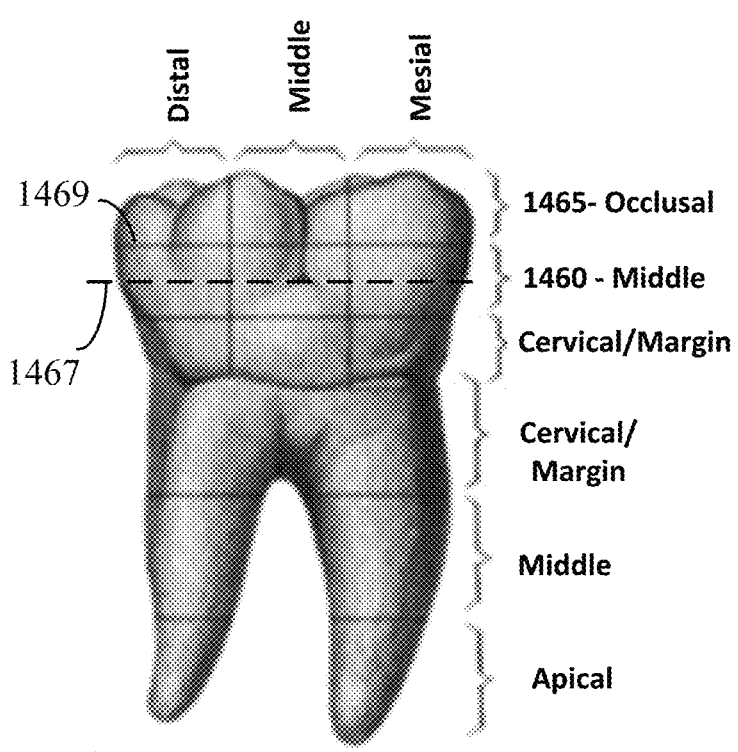

FIGS. 14N and 14O illustrate various regions of an incisor tooth and a molar, respectively. To better illustrates the various measurement locations, FIGS. 14A-O will be discussed concurrently below. The areas of a glazed crown that are important for proper fit of a crown in a patient are the mesial and distal contact areas. The mesial and distal contact areas are the areas of a crown that are adjacent to and/or abutting the adjacent teeth. To ensure a proper fit, glaze layer thickness measurements are taken in the contact areas to monitor the thickness of the glaze. If the glaze layer is too thick or thin, or if the glaze layer is of inconsistent thickness, the crown may not fit properly, e.g., the crown may have contacts that are too tight or that are open. In addition, if the glaze layer is too thick or thin, or if the glaze layer is of inconsistent thickness, the look and feel of the crown can be unpleasant. For an incisal tooth (see FIG. 14N), the region of interest within the mesial or distal surface—upon which glaze layer thickness measurements are taken—can be defined by the surfaces of the incisal portion 1452 and the middle portion 1455. In some embodiments, the region of interest can be the upper half of the crown, which is approximately from midline 1457 of middle portion 1455 to the occlusal surface (end of incisal portion 1452).

For bicuspids and molars (see FIG. 14O), the region of interest can be defined by the surfaces of the middle portion 1460 and occlusal portion 1465. For the molar shown in FIG. 14O, the region of interest can start from midline 1467 of middle portion 1460 to approximately where the occlusal surface of the molar begins (end of occlusal portion 1465). Glaze layer thickness measurements are taken at various points within the region of interest. For instance, measurements can be taken at three or more locations within the region of interest. In this way, an average glaze thickness of the critical contact area of a crown can be determined. An average glaze layer thickness of a crown can be obtained by averaging at least one measurement taken within middle portion 1460 and at least one measurement taken within occlusal portion 1465. For example, an average glaze layer thickness of the molar of FIG. 14O can be obtained by averaging one measurement in middle portion 1460—but above midline 1467—and two or more measurements in occlusal portion 1465. In another example, an average glaze thickness of the molar of FIG. 14O can be obtained by averaging the following measurements: one measurement on or substantially near the borderline of occlusal portion 1465 and middle portion 1460 (which is represented by borderline 1469); one or more measurements in occlusal portion 1465; and one or more measurements in middle portion 1460.

The glaze thickness within the region of interest of a crown can be obtained using topography data from the cross-sectional SEM image of the crown. SEM topography data can have a resolution of 0.4 nm using a secondary electron detector. Accordingly, using the SEM topography data, the glaze thickness of a crown can be measured with very high accuracy. Additionally, feature selection and measurement can be done digitally and accurately. For example, using the SEM system, the region of interest can be isolated and zoomed in to enable accurate selection of feature locations and measurements. This enables the user to accurately select measurement locations anywhere on the crown such as in the upper half of the crown, on midline 1467, on borderline 1469, anywhere on middle portion 1460, or anywhere on occlusal portion 1465.

FIG. 14B is a close-up image of region 1405 of crown 1400 shown in FIG. 14A. FIG. 14B shows two arrows indicating locations 1 and 2 where the thicknesses of the glaze layer are measured. Both locations 1 and 2 are in the upper half of crown 1400, which falls within the region of interest of crown 1400. As shown in FIG. 14B, location 1 is approximately at the borderline between the occlusal portion and the middle portion of crown 1400 (see. FIG. 14O). Location 2 is within the middle portion and in the upper half of crown 1400. The average glaze layer thickness can be taken at both locations 1 and 2. At least 3 measurements are taken at each location to obtain the average glaze layer thickness. In other words, two average glaze layer thickness values are determined for crown 1400, a first average thickness value for location 1 and a second average thickness value for location 2. Although FIG. 14B only shows two locations where the average glaze layer thicknesses are calculated, more than two average glaze layer thicknesses can be determined using two or more locations, as long as all locations are within the upper half of crown 1400.

FIG. 14C is a close-up SEM image of crown 1400 at location 1 (see FIG. 14B). As shown, three thickness measurements of the glaze material 1420 were taken at location 1. A first thickness measurement is taken at approximately the border between the occlusal and middle portions of crown 1400. A second measurement is taken at a location above the location of the first measurement, and a third measurement is taken at a location below the location of the first measurement. For crown 1400, location 1 has an average glaze layer thickness of 38.867 µm, a glaze layer thickness variance of 0.389 µm, and a standard deviation of 0.624 µm. Aside from bubble 1417, the glaze layer material 1420 is uniform and generally free of internal and surface defects such as cracks, surface delamination, and depressions as compared to glazed crowns manufactured using convention glazing methods (see FIGS. 15A-D).

FIG. 14D is a close-up SEM image of crown 1400 at location 2 (see FIG. 14B). Similar to location 1, three thickness measurements of glaze material 1420 were obtained at location 2. The empirical data show that crown 1400, at location 2, has an average glaze layer thickness of 33.133 µm, a glaze layer thickness variance of 1.076 µm, and a standard deviation of 1.037 µm. Using glazing system 200, the resulting glaze material at location 2 is generally uniform (e.g., very few to none bubble) and free of internal and surface defects such as cracks, holes, surface delamination, pits, and depressions.

FIG. 14E is a SEM image showing the left portion of the cross section of crown 1400 as shown in FIG. 14A. In FIG. 14E, there are two arrows showing locations 5 and 6, both of which are in the upper half of crown 1400. Similar to locations 1 and 2 of FIG. 14B, location 5 is in the occlusal portion of crown 1400 or on the borderline between the occlusal portion and the middle portion of crown 1400. Location 6 is in the middle portion of crown 1400, but in the upper half of crown 1400.

FIG. 14F is a close-up (500×) SEM image of location 5 shown in FIG. 14E. Three measurements were made at location 5. A first measurement is made on or near the borderline between the occlusal portion and the middle portion of crown 1400, a second measurement is made above the location of the first measurement, which is in the occlusal portion. A third measurement is below the first measurement. These measurements yield an average glaze thickness of 30.467 µm, a glaze thickness variance of 5.976 µm, and a standard deviation of 2.444 µm. As shown in FIG. 14F, glaze area 1428 is uniform and generally free of bubbles, surface delamination, and internal cracks.

FIG. 14G is a close-up (500×) SEM image of location 6 shown in FIG. 14E. Similar to location 5, three measurements were made at location 6, all of which are in the upper half portion of crown 1400. These measurements yield an average glaze layer thickness of 31.2 µm, a glaze layer thickness variance of 3.049 µm, and a standard deviation of 1.746 µm. As shown in FIG. 14G, glaze area 1432 is uniform and generally free of bubbles and internal cracks.

FIG. 14H is a cross-sectional SEM image of crown 1450. FIG. 14H shows two arrows indicating locations 1 and 2, both of which are in the upper half of crown 1450 and fall within the region of interest of crown 1450. Although FIG. 14H only shows two locations where the average glaze thickness is calculated, the average glaze thickness can be determined at more than two locations as long as all locations are within the upper half of crown 1450.

FIG. 14I is a close-up SEM image of crown 1450 at location 1 (see FIG. 14H). At location 1 of crown 1450, the average thickness is 59.5 µm and the standard deviation is 5.187 µm. Using glazing system 200, the resulting glaze material at location 1 of crown 1450 is generally uniform (e.g., very few to none bubble) and free of internal and surface defects such as cracks, holes, pits, and surface delamination.

FIG. 14J is a close-up SEM image of crown 1450 at location 2 (see FIG. 14H). At location 2 of crown 1450, the average thickness is 50.6 µm and the standard deviation is 1.636 µm. As shown in FIG. 14J, using glazing system 200, the resulting glaze material at location 2 of crown 1450 is free of internal and surface defects such as cracks, holes, pits, and depressions.

FIG. 14K is a cross-sectional SEM image of crown 1450 on the left side. Locations 5 and 6 of FIG. 14K are in the upper half of crown 1450. Both locations fall within the region of interest of crown 1450 as defined above with respect to FIGS. N-O. FIG. 14L is a close-up SEM image of crown 1450 at location 5, which has an average thickness of 43.0 µm and a standard deviation of 0.8 µm. As shown, the glaze material at location 5 of crown 1450 is also generally uniform (e.g., very few to none bubble) and free of internal and surface defects such as cracks, holes, pits, and depressions. FIG. 14M is a close-up SEM image of crown 1450 at location 6, which as an average thickness of 40.8 µm and a standard deviation of 2.076 µm.

In summary, the glazed crowns produced by auto glazing system 200 have a glaze average thickness ranging from 15 µm to 63 µm, such as from 20 µm to 50 µm, or from 30 µm to 46 µm, when measured according to the glaze layer thickness measurement method described herein. The glazed crowns produced by auto glazing system 200 also have a glaze thickness standard of deviation ranging from 0.5 µm to 6 µm, such as from 2 µm to 5 µm, or from 2 µm to 3 µm. Additionally, the data also show that most of the thickness variances are under 5.0 µm. Additionally, the glaze material is generally free surface and internal cracks, delamination, and holes. However, as will be shown below (FIGS. 15A-D), other prior art methods (e.g., manual, spray, and paste) of glazing dental prostheses have higher standard deviations and variance for crowns having an average glaze thickness than 11 to 12 µm. Additionally, crowns glazed by prior methods have significantly more internal cracks and/or surface delamination in comparison to crowns glazed using the systems and methods described herein.

Figure 15A:
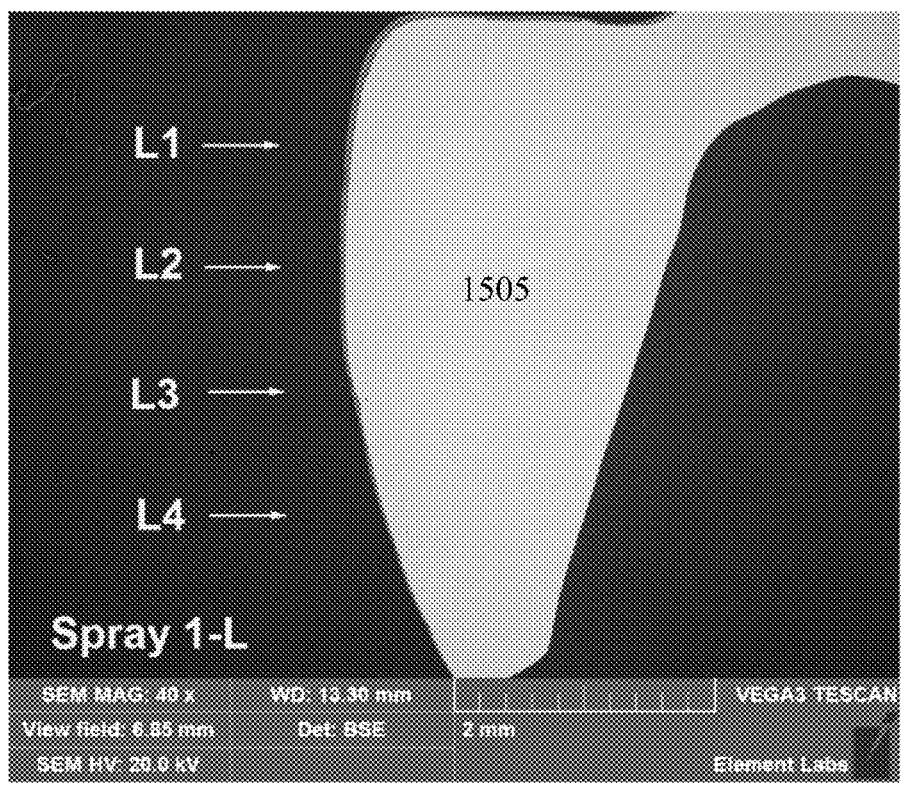
FIGS. 15A-F are SEM (scanning electron microscopy) images of crowns glazed by conventional glazing processes.
Figure 15B:
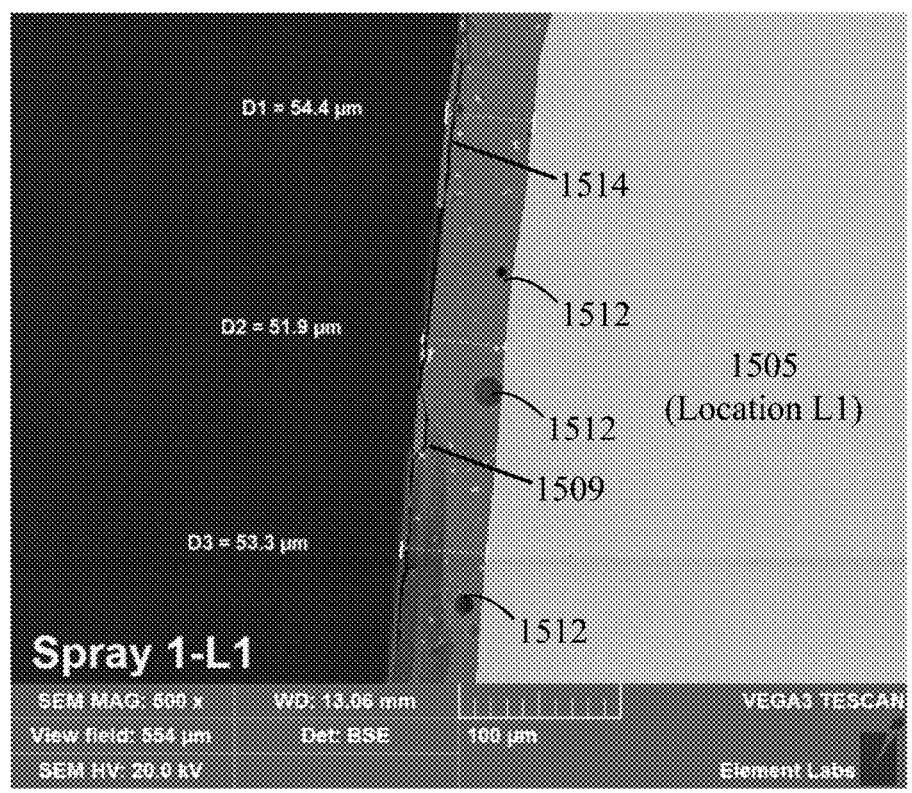

FIG. 15A is SEM image on the left side of crown 1505, which was glazed using a conventional (manual) spray method. FIG. 15B is a close-up SEM image of location L1 of crown 1505. At location L1, crown 1505 has an average thickness of 53.3 µm, a thickness variance of 1.047 µm, and a standard deviation of 1.023 µm. Although the thickness and standard deviation at location 1 are within acceptable ranges, the glaze area has substantial surface and internal defects. As shown, the glaze area at location L1 has numerous holes 1512, internal cracks 1509, and substantial surface delamination 1514, which can cause the glaze material to fall off prematurely.

Figure 15C:
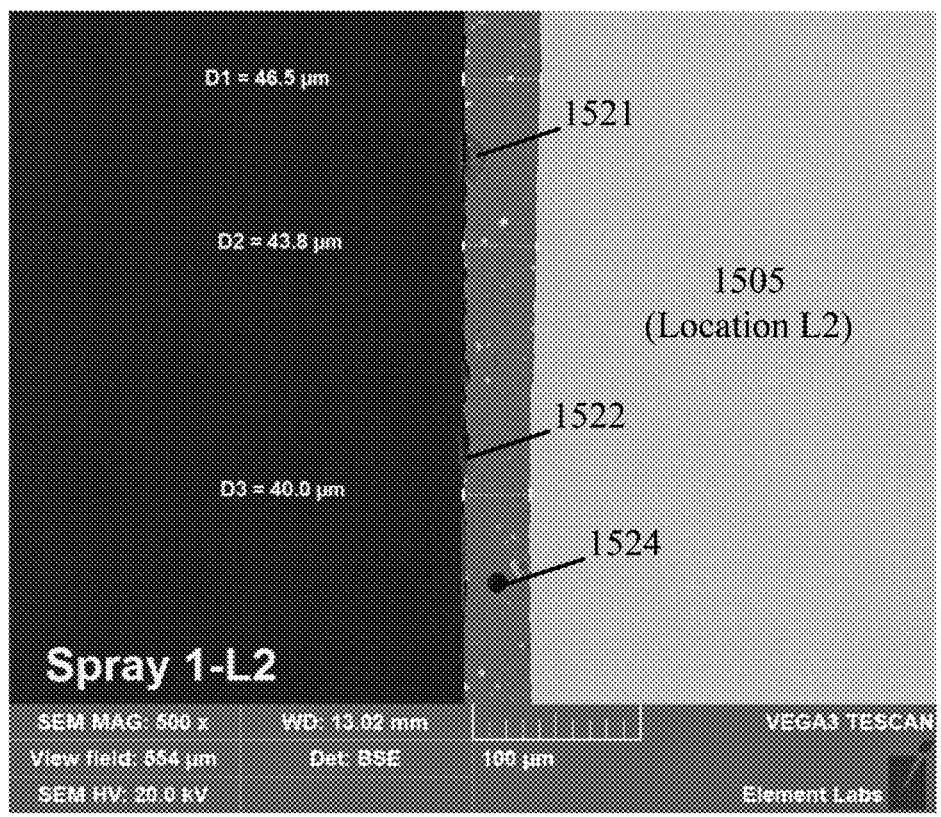

FIG. 15C is a close-up SEM image of a crown 1505 at location L2, which has an average glaze layer thickness of 43.8 µm, a variance of 7.1 µm, and a standard deviation of 2.66 µm. The glaze area of crown 1505 at location L2 has pit 1521, surface defects 1522, and hole 1524. These defects are undesirable because they can cause substantial patient discomfort and decrease the lifespan of the crown.

Figure 15D:
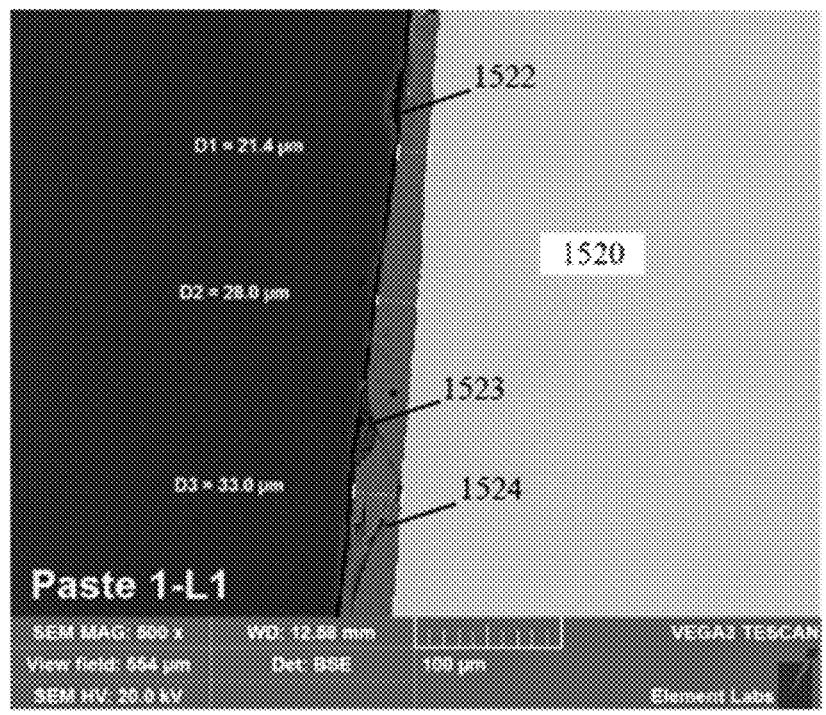

FIG. 15D is a close-up SEM image of a crown 1520 at location L1, which is similar to the location L1 of crown 1505. Crown 1520 is glazed using a conventional paste glazing method. At location L1, crown 1520 has an average thickness of 27.467 µm, a thickness variance of 22.57 µm, and a standard deviation of 4.75 µm. As shown, the conventional paste glazing method produces surface defect 1522, pit 1523, and large internal crack 1524, all of which are undesirable.

Figure 15E:
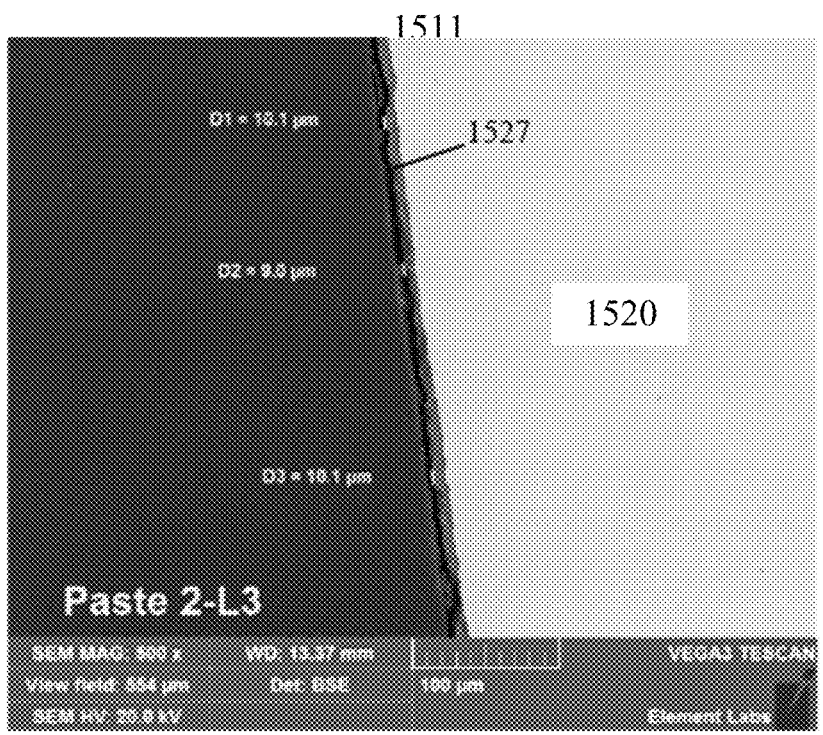
Figure 15F:
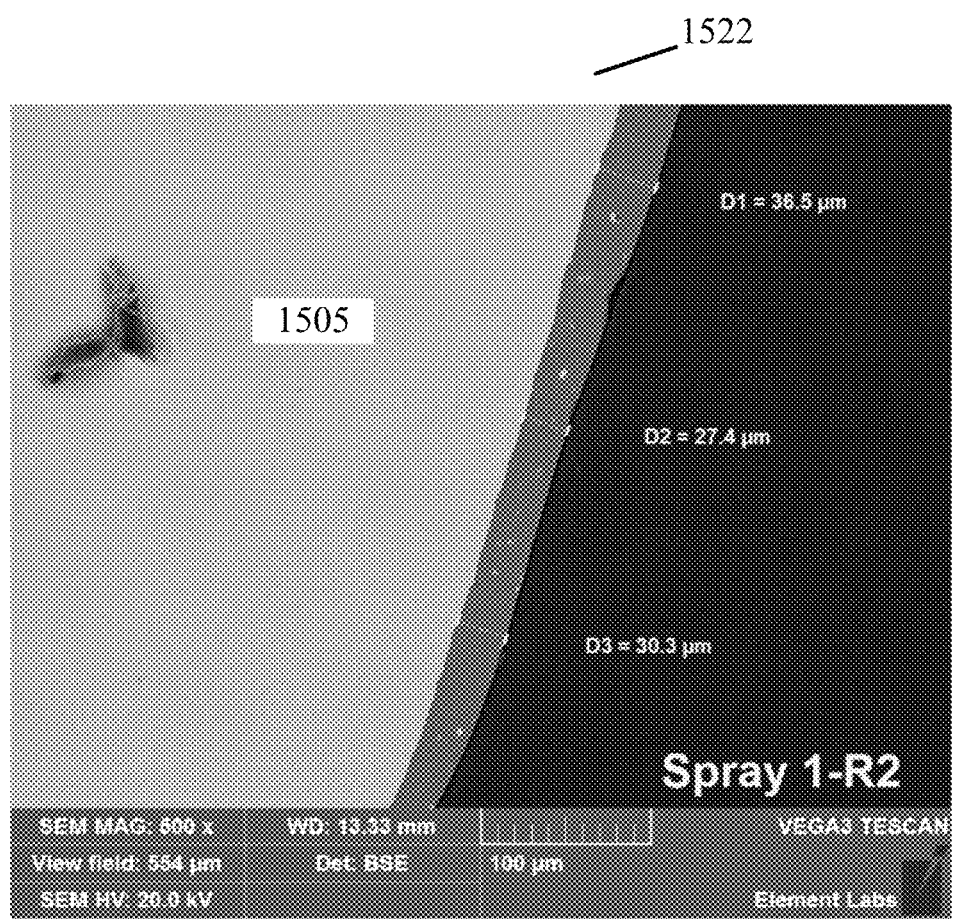

FIG. 15E is another close-up SEM image of crown 1525 at location L3, which has an average thickness of 10.1 µm, a thickness variance of 0.269 µm and a standard deviation of 0.519 µm. Although the variance and standard deviation of crown 1525 are good, the glaze thickness is very thin (e.g., around 10 µm). Further, crown 1525 has a substantial surface defect 1527—the glaze surface is wavy and contains many micro cracks. In summary, the quality of the glaze of crowns 1505 and 1520 are not good when compared against crowns that were glazed using auto system 200 (e.g., crowns 1400 and 1450). For example, crowns 1505 and 1525 shows many cracks and bubbles in the glaze area. Whereas, crowns 1400 and 1450 have substantially smooth glaze surface and are substantially cracks free within the glaze layer thickness. Additionally, as described above with respect to FIGS. 14A-H and FIGS. 15A-D, crowns that were glazed by auto glazing system 200 have lower variances and standard deviations than crowns glazed by prior art methods.

Further Example Embodiments

A first example system for applying glaze to a dental prosthesis includes a first spray gun, a gripper to hold the prosthesis and to rotate the prosthesis about an axis, and a controller. The gripper is coupled to a platform that is configured to tilt the gripper at a predetermined angle. The controller is configured to: tilt the platform at the predetermined angle prior to spraying a glaze solution at the dental prosthesis; rotate the gripper at a certain rotation rate; and spray the glaze solution from the first spray gun while the gripper is rotating.

In a first aspect of the first example system, the first spray gun is coupled to a second moveable platform, and the controller is further configured to move the first spray gun in a first trajectory based on at least one or more attributes of the dental prosthesis.

In a second aspect of the first example system, the example system further comprises a second spray gun. The first and second spray guns can be positioned to spray the glaze solution at the dental prosthesis from different angles. In accordance with the second aspect, the controller is configured to spray the glaze solution from the first spray gun while the gripper is rotating in a first direction and to spray the glaze solution from the second spray gun while the gripper is rotating in a second direction. The first and second directions can be the same or can be different. Additionally, the distance between the first spray gun and the gripper can be different than the distance between the second spray gun and the gripper. The second aspect of the first example system may be implemented in combination with the first aspect of the first example system, though the example embodiments are not limited in this respect.

In a first implementation of the second aspect of the first example system, the controller is further configured to: retract a repositionable rod within a lumen of each the first and second spray guns away from a nozzle of each respective spray gun after every glazing cycle; and force pressurized air through the nozzle of each respective spray gun while the repositionable rod is retracted.

In a second implementation of the second aspect of the first example system, the second aspect further comprises: a first and second glaze solution container fluidically coupled to the first and second spray guns, respectively; first and second intake pipes; and first and second intake-pipe-air channels. Each container comprises a rotatable mixer within the container, and each rotatable mixer is configured to rotate to keep the glaze solution homogenously mixed. The first and second intake pipes fluidically couple the first and second spray guns to the first and second glaze solution containers, respectively. The first and second intake-pipe-air channels are directly coupled to the first and second intake pipes, respectively. The controller is configured to force pressurized air into the first and second intake-pipe-air channels prior to a start of a glazing cycle.

In a third implementation of the second aspect of the first example system, the rotatable mixer can be mounted at a distance of 1/16 of an inch from the bottom of each container and a diameter of the rotatable mixer is sized such that the rotatable mixer is 1/16 of an inch away from an inner wall of each container. Additionally, the controller can be configured to clean the first and second spray guns of the glaze solution after a predetermined amount of sprays by forcing pressurized air through the first and second spray guns.

In a fourth implementation of the second aspect of the first example system, the first and second spray guns are positioned at an angle between 45-180 degrees with respect to each other. In a fifth implementation of the second aspect of the first example system, the spray velocity of the first and second spray guns is 3.5 and 5.7 meter per second, respectively.

In a third aspect of the first example system, the example system further comprises a glazing-purging (GP) block assembly coupled to the first spray gun. The GP block assembly comprises: an outlet portion fluidically coupled to the first spray gun; an actionable piston within a lumen of the cleaning block; and a glaze-solution inlet. In accordance with the second aspect of the first example system, the actionable piston comprises: an elongate fluid passage having a fluid inlet to receive a fluid and an aperture coupled to an external fluid reservoir; a glaze-solution passage; and an elongate air passage having an air-inlet to receive air. The actionable piston can be actuated to a first and a second positions. When the actionable piston in the second position, the elongate fluid passage is fluidically coupled to the outlet portion, and the fluid inlet is closed and the aperture to the external fluid reservoir is opened. When the actionable piston is in the first position, the glaze-solution inlet is fluidically coupled to the outlet portion via the glaze-solution passage. The third aspect of the first example system may be implemented in combination with the first and/or second aspect of the first example system, though the example embodiments are not limited in this respect.

In a fourth aspect of the first example system, the gripper is rotated at a rate of 15 rotation per minute for a total of 3 revolutions. The fourth aspect of the first example system may be implemented in combination with the first, second, and/or third aspect of the first example system, though the example embodiments are not limited in this respect.

In a first example method for applying glaze to a dental prosthesis, the first example method comprises: securing the dental prosthesis with a gripper coupled to a platform; rotating the gripper at a certain rate of rotation; and applying the glaze solution to the dental prosthesis using a first spray gun while the gripper is rotating.

In a first aspect of the first example method, the first example method further comprises tilting the platform at a predetermined angle prior to spraying a glaze solution at the dental prosthesis and applying the glaze solution to the dental prosthesis using a second spray gun. The first and second spray guns are positioned to spray the glaze solution at the dental prosthesis from different angles. The glaze solution from the first spray gun can be applied while the gripper is rotating in a first direction and the glaze solution from the second spray gun is applied while the gripper is rotating in a second direction. The first and second directions can be the same or different.

In a first implementation of the first aspect of the first example method, the first example method further comprises retracting a repositionable rod away from a nozzle of each the first and second spray guns after each glazing cycle and forcing pressurized air through the nozzle of the each of the first and second spray guns while the repositionable rod is retracted.

In a second implementation of the first aspect of the first example method, the first and second spray guns are positioned at an angle between 45-180 degrees with respect to each other. In a third implementation of the first aspect of the first example method, the first example method further comprise spraying the first spray gun at 7.125 inches away from the gripper and spraying the second spray gun at 6.275" inches away from the gripper.

In a second aspect of the first example method, the first example method further comprises actuating a moveable piston of a GP block assembly to a first position to allow the glaze solution to be sprayed from the first spray gun, and actuating the moveable piston to a second position to block the glaze solution from entering a lumen of the first spray gun and to allow pressured air to push the glaze solution out of an intake-pipe and back to a glaze solution container. In accordance with the second aspect, the GP block assembly is fluidically coupled to the first spray gun, and the cleaning solution is passed through a lumen and out of an exit nozzle of the first spray gun when the moveable piston is in the second position. The second aspect of first the example method may be implemented in combination with the first aspect of the example method, though the example embodiments are not limited in this respect.

In a second example method for applying glaze to a dental prosthesis, the second example method comprises: determining a type of dental prosthesis secured in a holder using a trained machine learning model; selecting a glazing profile based on the type of dental prosthesis determined by the trained machine learning model; and applying the glaze solution to the dental prosthesis using the selected glazing profile.

In a second example system for applying glaze to a dental prosthesis, the second example system comprises: a first spray gun; a gripper configured to hold the dental prosthesis and to rotate the dental prosthesis about an axis; and a controller configured. In accordance with the second example system, the controller is configured to rotate the gripper and spray a glaze solution from the first spray gun using a glazing profile based at least in part on a type of the dental prosthesis in a manner such that a cross-sectional thickness of a resulting-glazed material of the dental prosthesis has an average thickness range between 15 to 63 µm and a standard deviation of less than 3 µm when measured at locations in an upper half of the dental prosthesis, and wherein the glazing profile is configured to control the gripper and the first spray gun.

In a first aspect of the second example system, the second example system further comprises a second spray gun. The first and second spray guns are positioned to spray the glaze solution at the dental prosthesis from different angles. The controller is configured to spray the glaze solution from the first and second spray guns using the glazing profile based at least in part on the type of the dental prosthesis. The glazing profile comprises a rotation profile configured to: rotate the gripper in a first direction while the glaze solution is sprayed from the first spray gun; and
rotate the gripper in a second direction while the glaze solution is sprayed from the second spray gun.

In a first implementation of the first aspect of the second example system, the rotation profile is configured to rotate the gripper at a rate of 15 rotation per minute for a total of 3 revolutions.

In a third example method for applying glaze to a dental prosthesis, the third example method comprises: securing the dental prosthesis with a gripper; rotating the gripper according to a glazing profile configured to control a rotation of the gripper based at least on a type of the dental prosthesis; and applying, using a first spray gun, a glaze solution to the dental prosthesis according to the glazing profile such that the glazing profile generates a cross-sectional thickness of a resulting-glazed material of the dental prosthesis to have an average thickness greater than 12 µm and a standard deviation of less than 2.5 µm when thickness measurements are measured at locations in an upper half of the dental prosthesis. In accordance with the third example method, the glazing profile is based at least in part on the type of dental prosthesis.

System Architecture

Figure 16:
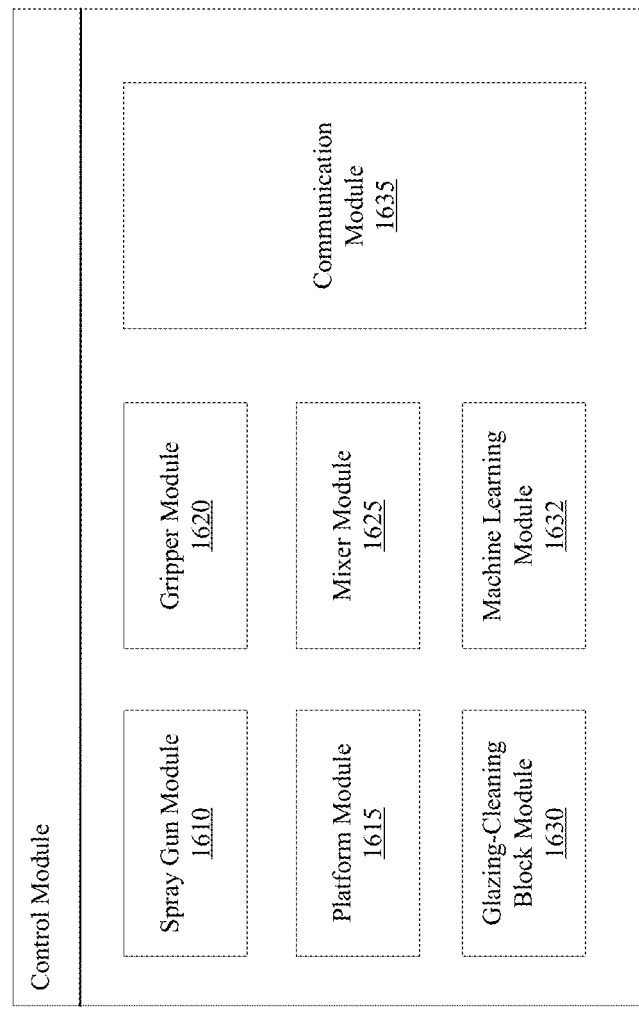
FIG. 16 is a block diagram illustrating an automated glazing system in accordance with some embodiments of the present disclosure.

FIG. 16 illustrates a system diagram of the control module 1600 in accordance with some embodiments of the disclosure. The control module 1600 can include a spay gun module 1610, a platform module 1615, a gripper module 1620, a mixer 235 module 1625, a GP block control module 1630, a machine learning module, and a communication module 1635. It should be noted that two or more of these modules can be combined and function as a single module. Additionally, each component or module of control module 1600 may communicate with each other and with external entities via communication module 1635. Each component or module of control module 1600 may include its own sub-communication module to further facilitate with intra and/or inter-system communication.

Control module 1600 (e.g., controller) can control the operation of various components of system 200 such as spray gun 205, mixer 235, various air valves (not shown), gripper 220, platform 225, GP block 230, piston 700, spray gun's moveable platform, etc. For example, at the start of the glazing process, the controller can open an air valve to allow pressurized air through intake pipe 240 to remove any diluted glaze solution leftover in intake pipe 240. Once the diluted glaze solution is expelled, the air valve to intake pipe 240 can be closed. It should be noted that this step can be done at the start of the glazing process or during the cleaning process.

For example, controller module 1600 can also pivot the platform and tilt both gripper 220 and the dental prosthesis at a certain angle in accordance with a glazing profile (which can include a platform profile and a gripper rotation profile). In some embodiments, the controller can tilt the dental prosthesis by 45° with respect to the ground. The controller can be configured to spin gripper 220 at 15 rotation per minute, then turn on spray gun 205 for half of a revolution of the dental prosthesis using gripper 220. The controller can cause spray gun 205 to turn off and turn on spray gun 210 for the next two revolutions and then turn off spray gun 210. In some embodiments, the controller can pull rod 410 back to allow any remaining glaze solution to be siphoned back into glaze solution container 215 after each glazing cycle or a predetermined amount of cycles.

Spray gun module 1605 contains codes, instructions, and algorithms which when executed by a processor will cause the processor to control one or more spray guns of system 200 and to cause each spray gun to operate in the manner described above with respects to FIGS. 2 through 10.

Platform module 1615 contains codes, instructions, and algorithms which when executed by a processor will cause the processor to control platform 225 of the system 200 to pivot and operate in the manner as described above with respect to FIGS. 2 through 10.

Gripper module 1620 contains codes, instructions, and algorithms which when executed by a processor will cause the processor to control gripper 220 of the system 200 to rotate, stop, and operate in a manner as described above with respect to FIGS. 2 through 10. Mixer module 1625 contains codes, instructions, and algorithms which when executed by a processor will cause the processor to control mixer 235 of the system 200 to rotate blades 305 in a manner as described above with respect to FIGS. 2 through 10.

GP block module 1630 contains codes, instructions, and algorithms which when executed by a processor will cause the processor to control GP block 230 of the system 200 to actuate between positions one and two and to operate in manner as described above with respect to FIGS. 2 through 12.

Machine learning module 1632 contains codes, instructions, and algorithms which when executed by a processor will cause the processor to determine the type of dental prosthesis by analyzing the images, obtained using a vision system, with a trained machine learning model. Machine learning module 1632 can also contain various neural networks such as a convolutional neural network (CNN), a generative neural network, and a fast CNN, etc. Machine learning module 1632 also contains codes and instructions to train a neural network, using dentition training data sets, to identify the types and features of a crown.

Figure 17:
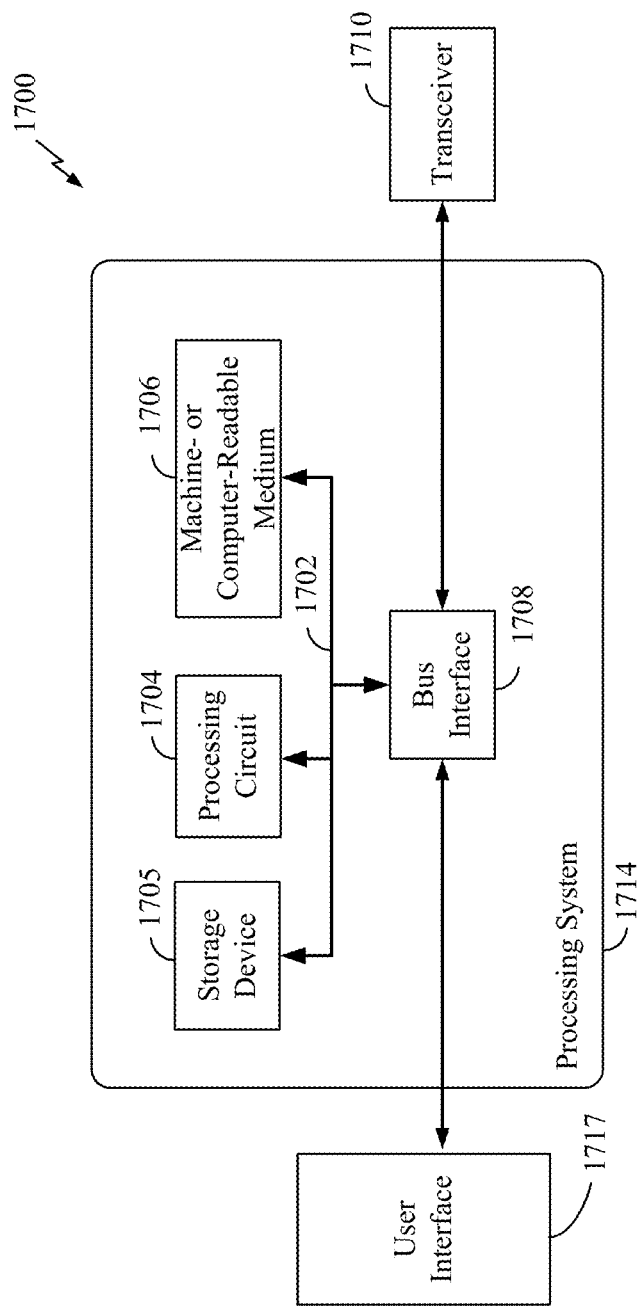
FIG. 17 is a block diagram illustrating an example of a hardware implementation for an apparatus employing a processing system that may exploit the systems and methods of FIGS. 1-14 and 16 in accordance with some embodiments of the disclosure.

FIG. 17 illustrates an overall system or apparatus 1700 in which the module 1600 and the process 100 can be implemented and the user interface 1712 can be generated. In accordance with various aspects of the disclosure, an element, or any portion of an element, or any combination of elements may be implemented with a processing system 1714 that includes one or more processing circuits 1704. The processing circuits 1704 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1704 may be used to implement any one or more of the processes described above and any processes inherent in the system described above and illustrated in FIGS. 2 through 10.

In the example of FIG. 17, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links various circuits including one or more processing circuits (represented generally by the processing circuit 1704), the storage device 1705, and a machine-readable, processor-readable, processing circuit-readable or computer-readable media (represented generally by a non-transitory machine-readable medium 1706.) The bus 1702 may also link various other circuits such as timing sources, peripherals, voltage regulators, and power management circuits, which are well known in the art, and therefore, will not be described any further. The bus interface 1708 provides an interface between bus 1702 and a transceiver 1710. The transceiver 1710 provides a means for communicating with various other apparatus over a transmission medium. Depending upon the nature of the apparatus, a user interface 1712 (e.g., keypad, display, speaker, microphone, touchscreen, motion sensor) may also be provided.

The processing circuit 1704 is responsible for managing the bus 1702 and for general processing, including the execution of software stored on the machine-readable medium 1708. The software, when executed by processing circuit 1704, causes processing system 1714 to perform the various functions described herein for any particular apparatus. Machine-readable medium 1708 may also be used for storing data that is manipulated by processing circuit 1704 during the execution of the software.

One or more processing circuits 1704 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1708. The machine-readable medium 1708 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1708 may reside in the processing system 1714, external to the processing system 1714, or distributed across multiple entities including the processing system 1714. The machine-readable medium 1708 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for applying glaze to a plurality of dental prostheses, the system comprising:
   a first spray gun;
   a second spray gun, wherein the first and second spray guns are positioned to spray the glaze solution at the dental prosthesis from different angles;
   a gripper configured to hold a dental prosthesis and to rotate the dental prosthesis about an axis; and
   a controller configured to:
   rotate the gripper and spray a glaze solution from the first spray gun and second spray gun using a glazing profile based at least in part on a type of the dental prosthesis such that a cross-sectional thickness of a resulting-glazed material of the plurality of dental prostheses has an average thickness range between 15 to 63 µm and a standard deviation of less than 3 µm when measured at locations in an upper half of each of the dental prostheses, wherein the glazing profile is configured to control the gripper and the first spray gun and the second spray gun;
   wherein the glazing profile comprises a rotation profile configured to:
   rotate the gripper in a first direction while the glaze solution is sprayed from the first spray gun; and
   rotate the gripper in a second direction different from the first direction while the glaze solution is sprayed from the second spray gun.

2. The system of claim 1, wherein the average thickness and the standard deviation are calculated from thickness measurements measured at three or more locations in the upper half of each of the dental prostheses, and at least one of the three or more locations is located in an occlusal or incisal portion of each of the dental prostheses.

3. The system of claim 1, wherein the cross-sectional thickness of the resulting-glazed material of each of the dental prostheses has a thickness variance of less than 6 µm.

4. The system of claim 1, wherein the first and second spray guns are positioned at an angle between 45-180 degrees with respect to each other.

5. The system of claim 1, wherein a distance between the first spray gun and the gripper is different than a distance between the second spray gun and the gripper.

6. The system of claim 1, wherein a spray velocity of the first and second spray guns is 3.5 and 5.7 meter per second, respectively.

7. The system of claim 1, wherein the rotation profile is configured to rotate the gripper at a rate of 15 rotation per minute for a total of 3 revolutions.

8. The system of claim 1, wherein the controller is further configured to:
   retract a repositionable rod within a lumen of each the first and second spray guns away from a nozzle of each respective spray gun after a predetermined number of glazing cycles; and
   force pressurized air through the nozzle of each respective spray gun while the repositionable rod is retracted.

9. The system of claim 1, further comprises:
   a first and second glaze solution container fluidically coupled to the first and second spray guns, respectively, each container comprises a rotatable mixer within the container, wherein each rotatable mixer is configured to rotate to keep the glaze solution homogenously mixed;
   first and second intake pipes to fluidically couple the first and second spray guns to the first and second glaze solution containers, respectively; and
   first and second intake-pipe-air channels directly coupled to the first and second intake pipes, respectively, wherein the controller is configured to force pressurized air into the first and second intake-pipe-air channels prior to a start of a glazing cycle.

10. The system of claim 1, further comprises a glazing-purging (GP) block assembly coupled to the first spray gun, the GP block assembly comprising:
    an outlet portion fluidically coupled to the first spray gun; and
    an actionable piston within a lumen of the cleaning block, the actionable piston comprises:
    an elongate fluid passage having a fluid inlet to receive a fluid and an aperture coupled to an external fluid reservoir;
    a glaze-solution passage; and
    an elongate air passage having an air-inlet to receive air, wherein the actionable piston can be actuated to a first and a second positions;
    a glaze-solution inlet, wherein when the actionable piston is in the first position, the glaze-solution inlet is fluidically coupled to the outlet portion via the glaze-solution passage, and
    wherein when the actionable piston in the second position, the elongate fluid passage is fluidically coupled to the outlet portion, the fluid inlet is closed and the aperture to the external fluid reservoir is opened.

11. A system for applying glaze to a plurality of dental prostheses, the system comprising:
    a first spray gun;
    a second spray gun, wherein the first and second spray guns are positioned to spray the glaze solution at the dental prosthesis from different angles;
    a gripper configured to hold a dental prosthesis and to rotate the dental prosthesis about an axis; and
    a controller configured to:
    rotate the gripper and spray a glaze solution from the first spray gun and second spray gun using a glazing profile based at least in part on a type of the dental prosthesis such that a cross-sectional thickness of a resulting-glazed material of the plurality of dental prostheses has an average thickness range between 15 to 63 μm and a standard deviation of less than 3 μm when measured at locations in an upper half of each of the dental prostheses;
    wherein the glazing profile is configured to:
    control the gripper and the first spray gun and the second spray gun;
    retract a repositionable rod within a lumen of each the first and second spray guns away from a nozzle of each respective spray gun after a predetermined number of glazing cycles; and
    force pressurized air through the nozzle of each respective spray gun while the repositionable rod is retracted.

12. A system for applying glaze to a plurality of dental prostheses, the system comprising:
    a first spray gun;
    a second spray gun, wherein the first and second spray guns are positioned to spray the glaze solution at the dental prosthesis from different angles;
    a gripper configured to hold a dental prosthesis and to rotate the dental prosthesis about an axis;
    a controller configured to:
    rotate the gripper and spray a glaze solution from the first spray gun and second spray gun using a glazing profile based at least in part on a type of the dental prosthesis such that a cross-sectional thickness of a resulting-glazed material of the plurality of dental prostheses has an average thickness range between 15 to 63 μm and a standard deviation of less than 3 μm when measured at locations in an upper half of each of the dental prostheses, wherein the glazing profile is configured to control the gripper and the first spray gun and the second spray gun;
    first and second glaze solution containers fluidically coupled to the first and second spray guns, respectively, each container comprises a rotatable mixer within the container, wherein each rotatable mixer is configured to rotate to keep the glaze solution homogenously mixed;
    first and second intake pipes to fluidically couple the first and second spray guns to the first and second glaze solution containers, respectively; and
    first and second intake-pipe-air channels directly coupled to the first and second intake pipes, respectively, wherein the controller is configured to force pressurized air into the first and second intake-pipe-air channels prior to a start of a glazing cycle.

13. A system for applying glaze to a plurality of dental prostheses, the system comprising:
    a first spray gun;
    a gripper configured to hold a dental prosthesis and to rotate the dental prosthesis about an axis;
    a controller configured to:
    rotate the gripper and spray a glaze solution from the first spray gun using a glazing profile based at least in part on a type of the dental prosthesis such that a cross-sectional thickness of a resulting-glazed material of each of the plurality of dental prostheses has an average thickness range between 15 to 63 μm and a standard deviation of less than 3 μm when measured at locations in an upper half of each of the dental prostheses, wherein the glazing profile is configured to control the gripper and the first spray gun; and a glazing-purging (GP) block assembly coupled to the first spray gun, the GP block assembly comprising:

an outlet portion fluidically coupled to the first spray gun; and an actionable piston within a lumen of the cleaning block, the actionable piston comprises:

an elongate fluid passage having a fluid inlet to receive a fluid and an aperture coupled to an external fluid reservoir;

a glaze-solution passage;

an elongate air passage having an air-inlet to receive air, wherein the actionable piston can be actuated to a first and a second positions;

a glaze-solution inlet, wherein when the actionable piston is in the first position, the glaze-solution inlet is fluidically coupled to the outlet portion via the glaze-solution passage, and wherein when the actionable piston in the second position, the elongate fluid passage is fluidically coupled to the outlet portion, the fluid inlet is closed and the aperture to the external fluid reservoir is opened.

* * * * *